(12) United States Patent
Engelbrecht et al.

(10) Patent No.: US 7,673,190 B1
(45) Date of Patent: Mar. 2, 2010

(54) SYSTEM AND METHOD FOR DETECTING AND RECOVERING FROM ERRORS IN AN INSTRUCTION STREAM OF AN ELECTRONIC DATA PROCESSING SYSTEM

(75) Inventors: Kenneth L. Engelbrecht, Blaine, MN (US); Lawrence R. Fontaine, Bloomington, MN (US); John S. Kuslak, Blaine, MN (US); Conrad S. Shimada, Oakdale, MN (US)

(73) Assignee: Unisys Corporation, Blue Bell, PA (US)

( * ) Notice: Subject to any disclaimer, the term of this patent is extended or adjusted under 35 U.S.C. 154(b) by 468 days.

(21) Appl. No.: 11/226,803

(22) Filed: Sep. 14, 2005

(51) Int. Cl.
*G06F 11/00* (2006.01)
(52) U.S. Cl. .......................... 714/49; 714/800
(58) Field of Classification Search ............... 714/49
See application file for complete search history.

(56) References Cited

U.S. PATENT DOCUMENTS

| | | | |
|---|---|---|---|
| 4,069,970 A * | 1/1978 | Buzzard et al. | 704/229 |
| 4,231,089 A * | 10/1980 | Lewine et al. | 714/7 |
| 4,604,750 A * | 8/1986 | Manton et al. | 714/764 |
| 4,823,252 A | 4/1989 | Horst et al. | |
| 5,136,696 A * | 8/1992 | Beckwith et al. | 712/240 |
| 5,577,259 A * | 11/1996 | Alferness et al. | 712/41 |
| 5,604,753 A | 2/1997 | Bauer et al. | |
| 5,774,648 A | 6/1998 | Kao et al. | |
| 5,794,071 A | 8/1998 | Watanabe et al. | |
| 5,875,201 A * | 2/1999 | Bauman et al. | 714/800 |
| 5,953,351 A * | 9/1999 | Hicks et al. | 714/763 |
| 6,243,666 B1 | 6/2001 | Boone et al. | |
| 6,457,119 B1 * | 9/2002 | Boggs et al. | 712/227 |
| 6,543,028 B1 * | 4/2003 | Jamil et al. | 714/800 |
| 6,658,621 B1 | 12/2003 | Jamil et al. | |
| 6,708,294 B1 * | 3/2004 | Nakao et al. | 714/42 |
| 6,718,494 B1 | 4/2004 | Jamil et al. | |
| 7,370,230 B1 * | 5/2008 | Flake | 714/10 |
| 2002/0082795 A1 * | 6/2002 | Quach | 702/117 |
| 2004/0193992 A1 | 9/2004 | Jamil et al. | |
| 2004/0205385 A1 * | 10/2004 | Smith | 714/6 |
| 2006/0126474 A1 * | 6/2006 | Hanks | 369/59.1 |

OTHER PUBLICATIONS

U.S. Appl. No. 10/278,559, "System and Method for Providing Uniform Control of a Pipeline Instruction Processor," 70 pages, filed Oct. 23, 2002.

(Continued)

*Primary Examiner*—Scott T Baderman
*Assistant Examiner*—Kamini Patel
(74) *Attorney, Agent, or Firm*—Richard J. Gregson; Robert P. Marley; Crompton, Seager & Tufte

(57) ABSTRACT

A system and method are provided for detecting and recovering from errors in an Instruction Cache RAM and/or Operand Cache RAM of an electronic data processing system. In some cases, errors in the Instruction Cache RAM and/or Operand Cache RAM are detected and recovered from without any required interaction of an operating system of the data processing system. Thus, and in many cases, errors in the Instruction Cache RAM and/or Operand Cache RAM can be handled seamlessly and efficiently, without requiring a specialized operating system routine, or in some cases, a maintenance technician, to help diagnose and/or fix the error.

28 Claims, 13 Drawing Sheets

OTHER PUBLICATIONS

U.S. Appl. No. 10/675,841, "System and Method for Detecting and Correcting Errors in a Control System," 41 pages, filed Sep. 30, 2003.

U.S. Appl. No. 11/180,435, "System and Method for Resolving Conflicts in an Instruction Pipeline," 51 pages, filed Sep. 13, 2005.

Rebaudengo et al., "An Accurate Analysis of the Effects of Soft Errors in the Instruction and Caches of a Pipelined Microprocessor," 6 pages, printed Mar. 18, 2005.

* cited by examiner

SYSTEM AND METHOD FOR DETECTING AND RECOVERING FROM ERRORS IN AN INSTRUCTION STREAM OF AN ELECTRONIC DATA PROCESSING SYSTEM

CROSS REFERENCE TO CO-PENDING APPLICATIONS

The current application has some subject matter in common with co-pending, commonly assigned, U.S. patent application Ser. No. 11/180,435, filed Jul. 13, 2005, and entitled, "System and Method for Resolving Conflicts in an Instruction Pipeline", and further with co-pending, commonly assigned, U.S. patent application Ser. No. 11/226,499, filed on even date herewith, and entitled, "System and Method for Detecting and Recovering from Errors in a Control Store of an Electronic Data Processing System".

TECHNICAL FIELD

This invention relates generally to handling errors within a digital system, and more particularly, to an improved system and method for handling errors occurring within an instruction stream of an electronic data processing system.

BACKGROUND

Most general-purpose digital computers provide a system for detecting and handling single-bit or multiple-bit parity errors. The occurrence of soft errors is not uncommon when data signals are being read from storage devices such as static random access memories (SRAMs) and dynamic random access memories (DRAMs). This is especially true when high-density memories are employed, as is generally the case in large data processing systems.

In one example, the presence of alpha and other particles can cause soft parity errors in static random access memories (SRAMs) and dynamic random access memories (DRAMs). Alpha particles are randomly generated, positively charged nuclear particles originating from several sources, including cosmic rays that come from outer space and constantly bombard the earth, and from the decay of natural occurring radio-isotopes like Radon, Thorium, and Uranium. Concrete buildings, and lead based products such as solder, paint, ceramics, and some plastics are all well-known alpha emitters. Especially smaller geometry storage devices can be adversely affected by the emission of alpha and other particles, causing a higher occurrence of soft parity errors.

As discussed above, storage devices such as any type of RAM are susceptible to the types of error conditions discussed above. This includes Instruction Cache RAMs and Operand Cache RAMs, which are commonly used in many data processing systems. For example, to increase system performance, it is common to use one or more Instruction Cache RAMs to cache one or more instructions for selection and execution by an instruction processor. Typically, if the desired instruction is not present in the Instruction Cache RAM, a cache miss occurs, and the desired instruction must be read from a higher level memory, such as a second level cache memory. Likewise, it is common to provide one or more Operand Cache RAMs to cache one or more operands for use by instructions that are executed by the instruction processor. If the desired operand is not present in the Operand Cache RAM, a cache miss occurs, and the desired operand must typically be read from a higher level memory, such as a second level cache memory.

When a parity error occurs in an Instruction Cache RAMs or an Operand Cache RAM, system performance and reliability can be affected. One way to detect parity errors is through the use of parity bits, as is known in the art. In some cases, a detected error is reported to a maintenance processor, operating system, or other error-handling system, which in the case of an Instruction Cache RAM or an Operand Cache RAM, often results in a critical error that halts the execution of the data processing system, and often requires a specialized operating system routine, or in some cases a maintenance technician, to help diagnose and fix the problem. This can bring the system down for some time, which can result in inefficient use of the data processing system resource. What is needed, therefore, is an improved system and method for detecting and then recovering from errors in an Instruction Cache RAM and/or an Operand Cache RAM.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

A system and method are provided for detecting and recovering from errors in an Instruction Cache RAM and/or Operand Cache RAM of an electronic data processing system. In some cases, errors in the Instruction Cache RAM and/or Operand Cache RAM are detected and recovered from without any required interaction of an operating system of the data processing system. Thus, and in many cases, errors in the Instruction Cache RAM and/or Operand Cache RAM can be handled seamlessly and efficiently, without requiring a specialized operating system routine, or in some cases, a maintenance technician, to help diagnose and/or fix the error.

In one illustrative embodiment, a pipelined instruction processor is provided that includes a number of pipelined stages. Instructions are read from an Instruction Cache Memory, and in some embodiments, are provided to an Instruction Queue. A parity error detector may be provided to detect parity errors as the instructions are read from the Instruction Cache Memory. When provided, the Instruction Queue may include a number of storage locations for storing a number of instructions, wherein each location has a parity error bit that is set if the instruction at that memory location has a detected parity error. The pipelined instruction processor may select instructions from the Instruction Queue for execution by the pipeline instruction processor. A selected instruction may be read from the Instruction Queue and provided to a first pipeline stage of the pipelined instruction processor.

Not all of the instructions stored in the Instruction Queue may be selected for execution by the pipelined instruction processor. For example, in some cases, such as when one of the executed instructions is a jump instruction, the sequence of instruction execution may change, resulting in some of the instructions in the Instruction Queue being flushed from the Instruction Queue and not executed. New instructions that correspond to the new instruction flow may be loaded from the Instruction Cache Memory and into the Instruction Queue. The parity error detector may identify which of the new instructions have a parity error, and mark those instructions via the parity error bit in the Instruction Queue.

In some illustrative embodiments, instructions read from the Instruction Cache Memory that have a detected parity error are provided to the Instruction Queue, without halting execution of the data processing system. These instructions are merely marked as having a parity error, by setting the corresponding parity error bit in the Instruction Queue. If one of the instructions that include a parity error is actually selected for execution, then an error handler may issue a parity error abort message that may at least temporarily halt the execution of the corrupted instruction, and the parity error may be dealt with at that time. However, some of the instructions in the Instruction Queue that are marked as having a parity error may not actually be selected for execution, and for these instructions, the instruction processor is not halted, and instruction execution is allowed to continue.

In many prior art data processing systems, if a parity error is detected anywhere along the instruction path, whether the particular instruction will actually be executed or not, a critical error is issued and the execution of the data processing system is halted. As noted above, such a critical error often requires a specialized operating system routine, or in some cases, a maintenance technician, to help diagnose and fix the problem. This can bring the system down for some time, which can result in inefficient use of the data processing system resource.

In some cases, the Instruction Cache Memory is a First Level Instruction Cache memory (I-FLC) that provides instructions to the Instruction Queue. A Second Level Cache memory (SLC) may also be provided for providing instructions to the I-FLC. When a parity error abort message is issued, the Parity Error Handler may halt the execution of the instruction that included the parity error (and in some cases, other instructions that follow the corrupted instruction), and may cause the selected instruction to be reloaded from the SLC into the I-FLC, and eventually to the pipelined stages of the instruction processor for re-execution. In some cases, the Parity Error Handler may be adapted to accomplish this without any required interaction with the operating system. In some embodiments, the location of the instruction in the I-FLC that included the parity error may be marked, such as by setting a valid flag for that location to zero. When the corrupted instruction is reloaded into the I-FLC, the instruction may be reloaded into the same or a different location within the I-FLC. Subsequently, if an instruction is read from a marked location of the I-FLC, and a parity error is again detected, the marked location (or in some cases, a block of locations) may be degraded. Such a situation may indicate a hard error at that memory location, rather than just a soft error. While this example downgrades the memory location (or in some cases, a block of locations) in the I-FLC after a second instruction that has a detected parity error is read from the memory location, it is contemplated that a memory location may be downgraded after any number of instructions that have a detected parity error are read from the memory location (e.g. 2, 3, 4, 5, etc.).

In some illustrative embodiments, the number of downgraded memory locations may be tracked and/or counted. In some cases, if the number of downgraded memory locations in the I-FLC exceeds a threshold number, a report may be sent to a maintenance processor. The maintenance processor may track how many and/or which portions of the I-FLC have been marked and/or degraded. In some cases, the maintenance processor may determine that the I-FLC may need to be replaced during a next scheduled maintenance period. Meanwhile, however, the data processing system may continue to operate normally.

In some illustrative embodiments, the I-FLC may provide a selected instruction directly to a first stage of the pipelined instruction processor. In this embodiment, an Instruction Queue may not be provided, or the selected instruction may bypass the Instruction Queue. In these cases, the selected instruction may be selected directly from the I-FLC, and not an Instruction Queue as described above. In one illustrative embodiment, each location of the I-FLC may include a parity error bit that is set if the instruction at that memory location has a detected parity error. The pipelined instruction processor may select instructions from the I-FLC for execution by the pipeline instruction processor. A selected instruction is read from the I-FLC and provided to a first pipeline stage of the pipelined instruction processor.

Like above, not all of the instructions stored in the I-FLC may be selected for execution by the pipelined instruction processor. If one of the instructions that include a parity error is actually selected from the I-FLC for execution, then an error handler may issue a parity error abort message, and the parity error may be dealt with at that time. However, some of the instructions in the I-FLC that are marked as having a parity error, may not actually be selected for execution, and for these instructions, the instruction processor is not halted, and instruction execution is allowed to continue.

In some embodiments, the first stage of the pipelined instruction processor may include a parity error flag, which stores the parity error bit of the Instruction Queue or I-FLC. Logic may be provided that reads the parity error flag in the first stage of the pipelined instruction processor, and may report the parity error flag to the Parity Error Handler. The Parity Error Handler may, for example, halt the execution of the instruction that included the parity error (and in some cases, other instructions that follow the corrupted instruction), and may cause the selected instruction to be reloaded from the SLC into the I-FLC, and eventually to the pipelined stages of the instruction processor for re-execution. As noted above, the Parity Error Handler may be adapted to accomplish this without any required interaction with the operating system.

A system and method is also provided for detecting and recovering from errors in an Operand Cache Memory. In one illustrative embodiment, when an instruction in the instruction pipeline requests an operand from a first level Operand Cache Memory (O-FLC), a parity error detector determines whether the requested operand has a parity error. If the operand does have a parity error, an Parity Error handler may halt execution of the instruction that requested the corrupted operand (and sometimes instructions thereafter), mark the location in the Operand Cache Memory that stored the operand that had the parity error, refetch the operand from a second level cache and store it in the O-FLC, and re-execute the instruction that requested the corrupted operand. In some cases, the instruction that requested the corrupted operand may already be at the second or third pipeline stage in the pipelined instruction processor. In some cases, the instruction may be moved back to the first pipeline stage when re-executed, if desired.

As noted above, and in some embodiments, the location of the operand in the O-FLC that included the parity error may be marked, such as by setting a valid flag for that location to zero. When the corrupted operand is reloaded into the O-FLC, the operand may be reloaded into the same or a different location within the O-FLC. Subsequently, if an operand is read from a marked location of the O-FLC, and a parity error is again detected, the marked location (or in some cases, a block of locations) may be degraded. Such a situation may indicate a hard error at that memory location, rather than just a soft error. While this example downgrades the memory location (or in some cases, a block of locations) in the O-FLC after a second operand that has a detected parity error is read from the memory location, it is contemplated that a memory location may be downgraded after any number of operands that have a detected parity error are read from the memory location (e.g. 2, 3, 4, 5, etc.).

In some illustrative embodiments, the number of downgraded memory locations in the O-FLC may be tracked and/or counted. In some cases, if the number of downgraded memory locations in the O-FLC exceeds a threshold number, a report may be sent to a maintenance processor. The maintenance processor may track how many and/or which portions of the O-FLC have been marked and/or degraded. In some cases, the maintenance processor may determine that the O-FLC may need to be replaced during a next scheduled maintenance period. Meanwhile, however, the data processing system may continue to operate normally.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION

The present invention may be used in conjunction with many types of electronic data processing systems, and in particular, electronic data processing systems that use one or more control stores. However, for illustrative purposes, the present invention is described in detail with reference to a pipelined instruction processing system.

Figure 1:
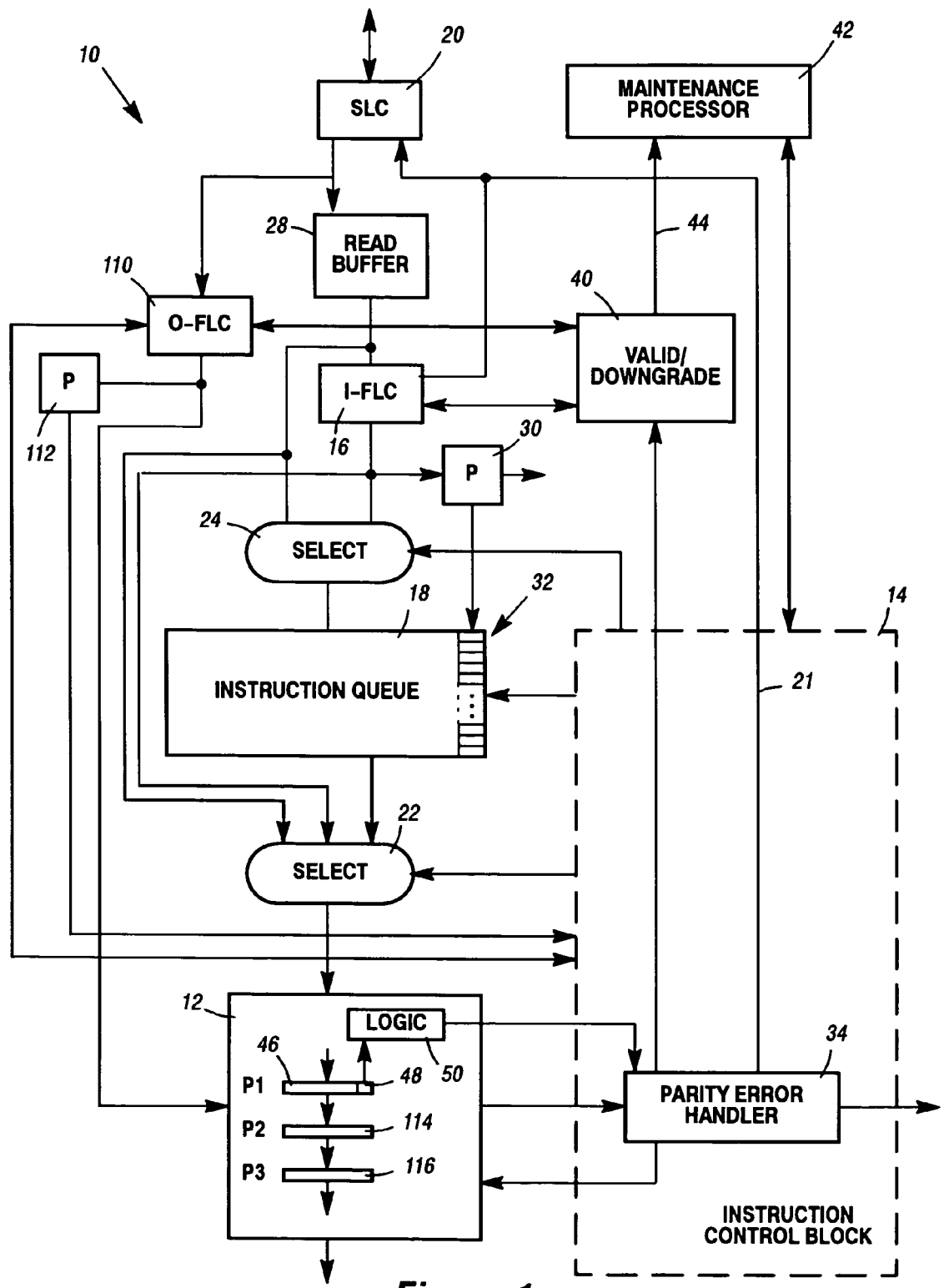
FIG. 1 is a schematic block diagram of an illustrative data processing system in accordance with the present invention.

FIG. 1 is a schematic block diagram of an illustrative data processing system in accordance with the present invention. The illustrative data processing system includes a Pipelined Instruction Processor, generally shown at 10. The Pipelined Instruction Processor 10 includes a number of Pipelined Stages 12 for processing instructions. Instructions are provided to the Pipelined Stages 12 under control of an Instruction Control Block 14.

During normal operation, the Instruction Control Block 14 provides an address of a requested instruction to the Instruction Queue 18. If present, the requested instruction is provided to the Pipelined Stages 12 via Selector 22. If the requested instruction is not present in the Instruction Queue 18, the Instruction Control Block 14 may provide the address of the requested instruction to a tag memory (not explicitly shown in FIG. 1) of the I-FLC 16 to determine if the requested instruction is resident within the I-FLC 16. If the requested instruction is resident in the I-FLC 16, the address is provided to the I-FLC 16 so that the addressed instruction may be retrieved and provided to the Instruction Queue 18 via selector 24. In the illustrative embodiment, a block of eight instructions, including the requested instruction, are provided to the Instruction Queue 18. In some cases, and to decrease the time it takes to get the requested instruction to the Pipelined Stages 12, the requested instruction may also be provided directly to the Pipelined Stages 12 via selector 22.

If the requested instruction is not resident in the I-FLC 16, a cache miss occurs, and the address of the requested instruction is provided SLC 20 via Interface 21. When the instruction becomes available, it is provided to the I-FLC 16 via Read Buffer 28, and forwarded to the Instruction Queue 24 via Selector 24. In some cases, and to decrease the time it takes to get the requested instruction to the Pipelined Stages 12, the requested instruction may also be provided directly to the Pipelined Stages 12 via Selector 22.

In one illustrative embodiment, a Parity Error Detector 30 may be provided to detect and mark parity errors as the instructions are read from the I-FLC 16. When provided, the Instruction Queue 18 may include a number of storage locations for storing a number of instructions (e.g. eight), wherein each location has a parity error bit, generally shown at 32, which is set by the Parity Error Detector 30 if the corresponding instruction at that memory location has a detected parity error. The Instruction Control Block 14 selects instructions from the Instruction Queue 18 for execution by the Pipelined Stages 12. A selected instruction may be read from the Instruction Queue 18 and provided to a first pipeline stage of the Pipelined Stages 12 via Selector 22.

Not all of the instructions stored in the Instruction Queue 18 may be selected for execution by the Instruction Control Block 14. For example, and in some cases, such as when one of the executed instructions is a jump instruction, the sequence of instruction execution may change, resulting in some of the instructions in the Instruction Queue 18 being flushed from the Instruction Queue 18 and not executed. New instructions that correspond to the new instruction flow will be loaded from the I-FLC 16 and into the Instruction Queue 18. The Parity Error Detector 30 may identify which of the new instructions have a parity error, and mark those instructions via the Parity Error Bits 32 in the Instruction Queue 18.

As can be seen, and in the illustrative embodiments, instructions read from the I-FLC 16 that have a detected parity error are provided to the Instruction Queue 18, without halting execution of the data processing system. These instructions are merely marked as having a parity error by, for example, setting the corresponding Parity Error Bit 32 in the Instruction Queue 18. If one of the instructions that include a parity error is actually selected for execution, then a Parity Error Handler 34 may issue a parity error abort message, and the parity error may be dealt with at that time. However, some of the instructions in the Instruction Queue 18, which are marked as having a parity error, may not actually be selected for execution by the Instruction Control Block 14, and for these instructions, the instruction processor is not halted, and instruction execution is allowed to continue.

In many prior art data processing systems, if a parity error is detected anywhere along the instruction path, whether the particular instruction will actually be executed or not, a critical error is issued and the execution of the data processing system is halted. As noted above, such a critical error often requires a specialized operating system routine, or in some cases, a maintenance technician, to help diagnose and fix the problem. This can bring the system down for some time, which can result in inefficient use of the data processing system resource.

When a parity error abort message is issued, the Parity Error Handler 34 may halt the execution of the instruction that included the parity error (and in some cases, other instructions that follow the corrupted instruction), and may cause the requested instruction to be reloaded from the SLC 20 into the I-FLC 16, and eventually to the Pipelined Stages 12 of the instruction processor for re-execution. In some cases, the Parity Error Handler 34 is adapted to accomplish this without any required interaction with the operating system.

When a parity error occurs, the location of the instruction in the I-FLC 16 that included the parity error may be marked via Valid/Downgrade Block 40. Valid/Downgrade Block 40 may, for example, set a valid flag for that location to zero. Valid/Downgrade Block 40 may also provide a parity error signal to a maintenance processor 42 via interface 44 for tracking purposes. When the corrupted instruction is reloaded into the I-FLC 16, the instruction may be reloaded into the same or a different location within the I-FLC 16. Subsequently, if an instruction is read from a marked location of the I-FLC 16, and a parity error is again detected, the marked location (or in some cases, a block of locations) may be degraded by Valid/Downgrade Block 40. A degraded location or block will not be used. Such a situation may indicate a hard error at that memory location, rather than just a soft error. While this example downgrades the memory location (or in some cases, a block of locations) in the I-FLC 16 after a second instruction that has a detected parity error is read from the memory location, it is contemplated that a memory location may be downgraded after any number of instructions that have a detected parity error are read from the memory location (e.g. 2, 3, 4, 5, etc.).

In some illustrative embodiments, the number of downgraded memory locations may be tracked and/or counted. For example, and in some cases, if the number of downgraded memory locations in the I-FLC 16 exceeds a threshold number, the Valid/Downgrade Block 40 may report such an event to a maintenance processor 42 via interface 44. The Maintenance Processor 42 may track how many and/or which portions of the I-FLC 16 have been marked and/or degraded. In some cases, the Maintenance Processor 42 may determine that the I-FLC 16 may need to be replaced during a next scheduled maintenance period. Meanwhile, however, the data processing system may continue to operate normally.

In some illustrative embodiments, the I-FLC 16 may provide a requested instruction directly to a First Stage 46 of the Pipelined Instruction Processor 10. In this embodiment, the Instruction Queue 18 may not be provided, or the selected instruction may bypass the Instruction Queue 18 via Selector 22. In these cases, the requested instruction may be requested directly from the I-FLC 16, and not the Instruction Queue 18 as described above.

In some cases, each location of the I-FLC 16 may include a parity error bit, similar to the parity error bits 32 of Instruction Queue 18, which are set if the corresponding instruction at the memory location has a detected parity error. The Instruction Control Block 14 may select instructions from the I-FLC 16 for execution by the Pipelined Stages 12. A selected instruction may be read from the I-FLC 16 and provided to a first pipeline stage 46 of the Pipeline Stages 12.

Like above, and in this illustrative embodiment, not all of the instructions stored in the I-FLC 16 may be selected for execution by the Instruction Control Block 14. If one of the instructions that include a parity error is actually selected from the I-FLC 16 for execution, then Parity Error Handler 34 may issue a parity error abort message, and the parity error may be dealt with at that time. However, some of the instructions in the I-FLC 16, which are marked as having a parity error, may not actually be selected for execution, and for these instructions, the instruction processor is not halted, and instruction execution is allowed to continue.

In some embodiments, the First Stage 46 of the Pipelined Stages 12 may include a Parity Error Flag 48, which stores the parity error bit provided by the Instruction Queue 18 or I-FLC 16. In some cases, such as when an instruction bypasses the Instruction Queue 18, or if an Instruction Queue 18 is not provided and the I-FLC 16 does not have a parity error bit, the Parity Error Detector 30 may detect an error in the instruction as it exits the I-FLC 16 and directly set the Parity Error Flag 48 in the First Stage 46 of the Pipelined Stages 12.

A logic block 50 may be provided, which reads the Parity Error Flag 48 in the First Stage 46 of the Pipelined Stages 12, and reports the parity error flag to the Parity Error Handler 34 of the Instruction Control Block 14. In response, the Parity Error Handler 34 may, for example, halt the execution of the instruction that included the parity error (and in some cases, other instructions that follow the corrupted instruction), and cause the requested instruction to be reloaded from the SLC 20 into the I-FLC 16, and eventually to the Pipelined Stages 12 of the instruction processor for re-execution. As noted above, the Parity Error Handler 34 may be adapted to accomplish this without any required interaction with the operating system.

Figure 2:
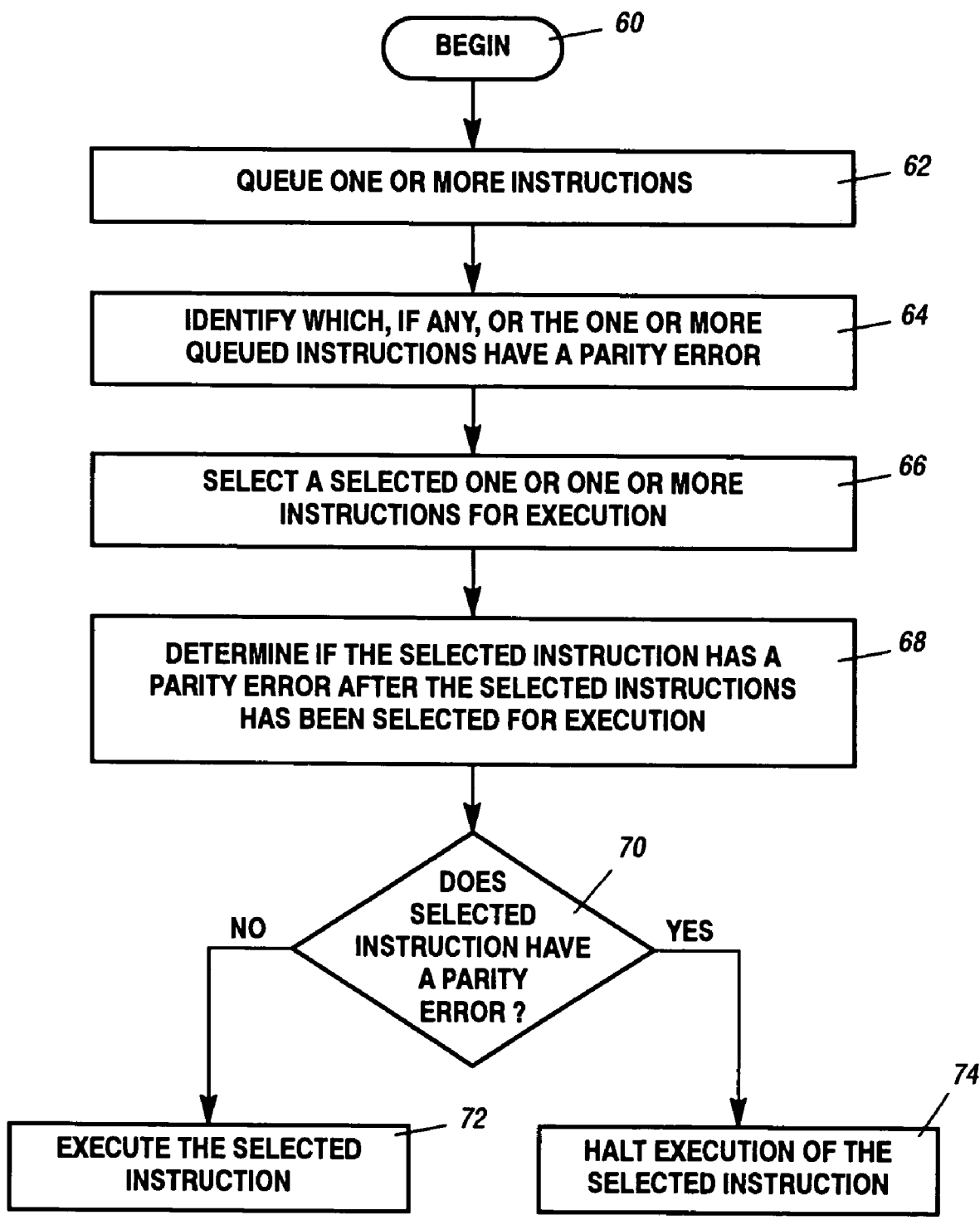
FIG. 2 is a flow diagram of an illustrative method of the present invention.

FIG. 2 is a flow diagram of an illustrative method of the present invention. The illustrative method is entered at step 60, and control is passed to step 62. Step 62 queues one or more instructions. Step 64 identifies which, if any, of the one or more queued instructions have a parity error. Step 66 selects a selected instruction from the one or more queued instructions. Step 68 determines if the selected instruction has a parity error.

Step 70 is a decision block. If the selected instruction does not have a parity error, control is passed to step 72, and the selected instruction is executed. If, however, the selected instruction does have a parity error, control is passed to step 74, and execution of the selected instruction is halted.

Figure 3:
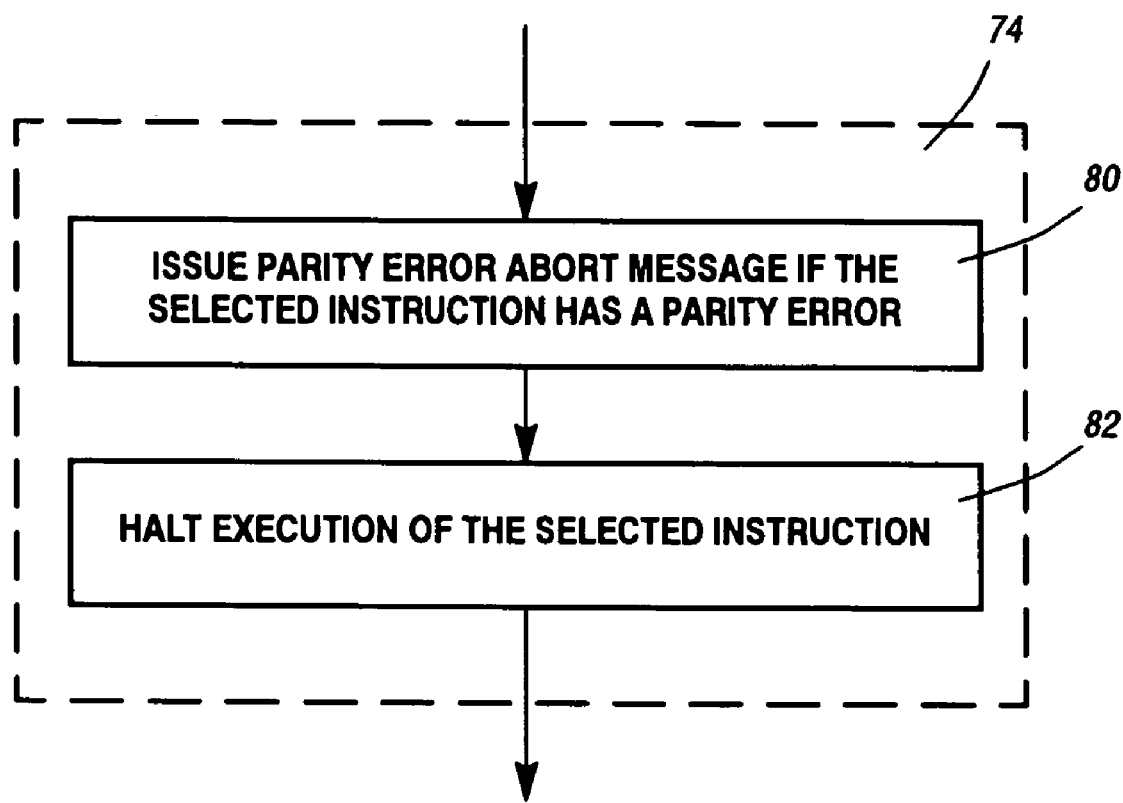
FIG. 3 is a more detailed illustrative flow diagram of the halt step of FIG. 2.

FIG. 3 is a more detailed illustrative flow diagram of the halt step 74 of FIG. 2. As shown in FIG. 3, the halt step 74 may include, for example steps 80 and 82. Step 80 issues a parity error abort message if the selected instruction has a parity error, and step 82 halts execution of the selected instruction (and in some cases, other instructions that follow the corrupted instruction).

Figure 4:
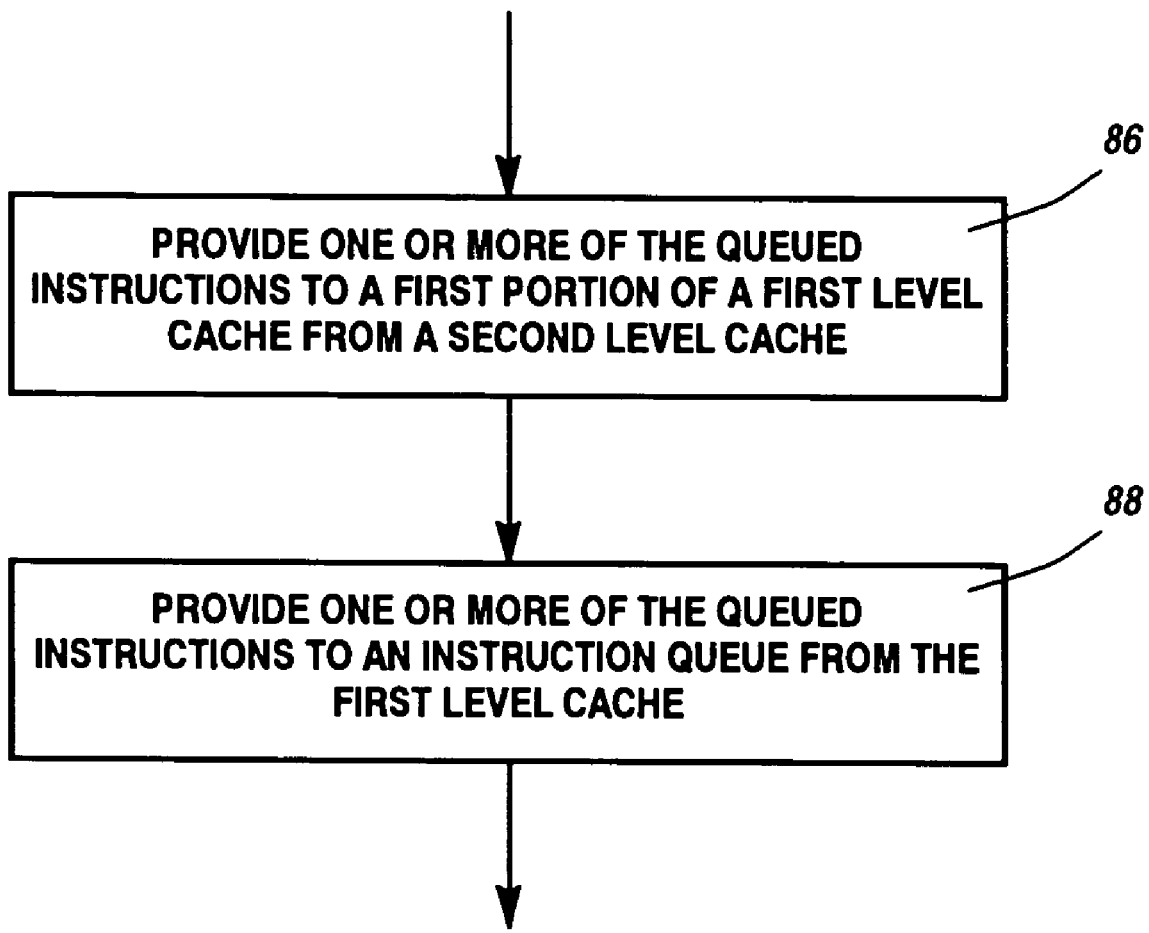
FIG. 4 is a flow diagram of showing additional steps that may cooperate with the method shown in FIG. 2.

FIG. 4 is a flow diagram of showing additional steps that may cooperate with the method shown in FIG. 2. In FIG. 4, and as shown at step 86, one or more of the queued instructions may be provided to a first portion (e.g. first cache line) of a first level cache from a second level cache. Step 88 provides one or more of the queued instructions to an Instruction Queue from the first level cache, resulting in the one or more queued instructions, as shown at step 62 of FIG. 2.

Figure 5:
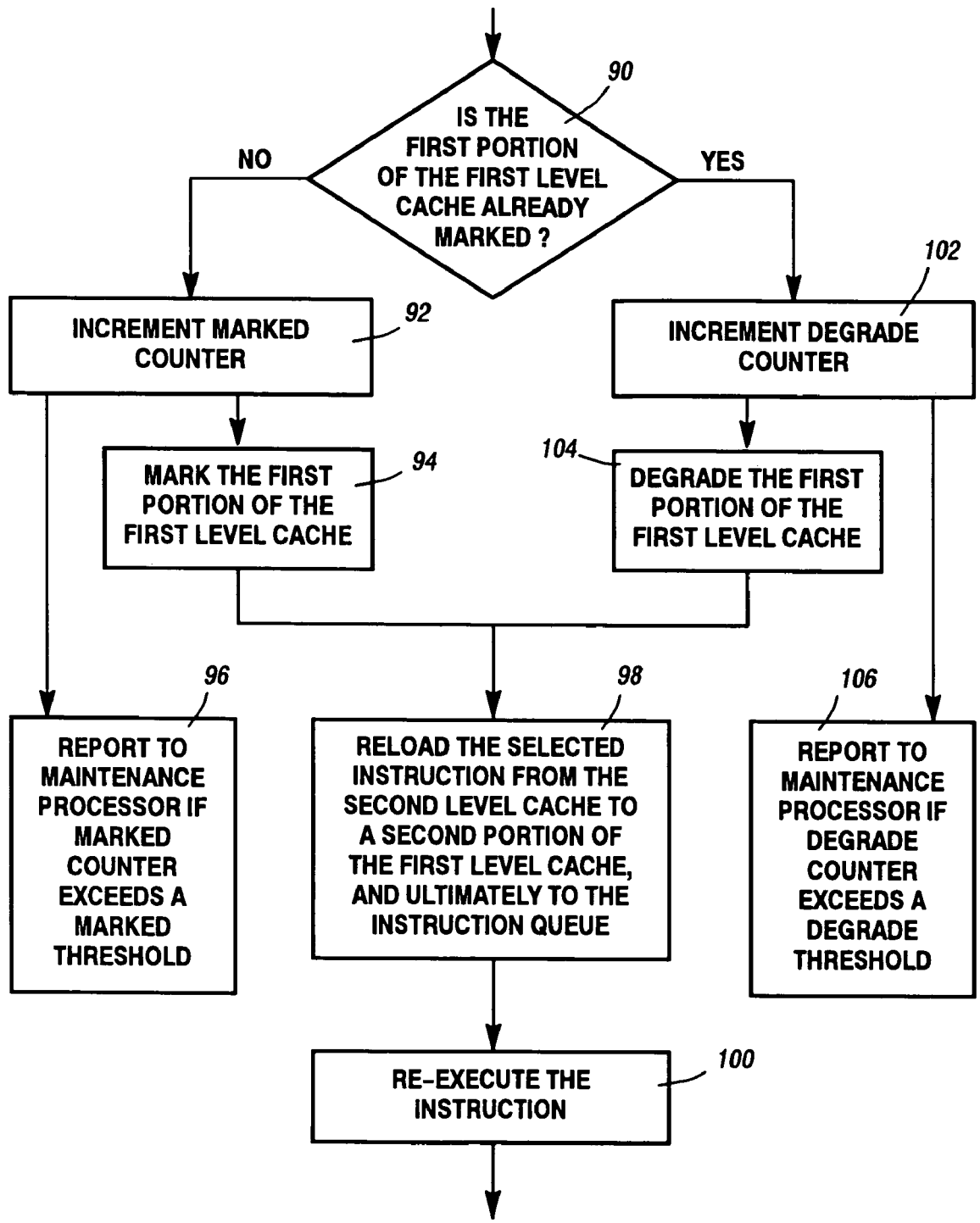
FIG. 5 is a flow diagram showing additional steps that may be included in the method shown in FIG. 2 when the additional steps shown in FIG. 4 are provided.

FIG. 5 is a flow diagram showing additional steps that may be included in the method shown in FIG. 2 when the additional steps shown in FIG. 4 are provided. Referring back to FIG. 2, after execution of the selected instruction is halted at step 74, control may be passed to step 90 of FIG. 5. Step 90 determines whether the first portion (e.g. first cache line) of the first level cache has already been marked. As noted in FIG. 4, the first portion (e.g. first cache line) of the first level cache provided the selected instruction, and it has been determined by steps 68 and 70 of FIG. 2 that the selected instruction has a parity error. If the first portion (e.g. first cache line) of the first level cache has not already been marked, control is passed to step 92. Step 92 increments a Marked Counter that corresponds to the first level cache. The marked counter may keep track of the number of marked storage locations, cache lines and/or memory blocks in the first level cache that have resulted in a parity error. Step 96 reports to a maintenance processor if the Marked Counter exceeds a Marked Threshold Value. The Marked Threshold Value may be settable, such as via scan-set, by the maintenance processor. Alternatively, or in addition, step 96 may report to the maintenance processor that a portion (e.g. cache line) of the first level cache is being marked.

Control is then passed to step 94. Step 94 marks the first portion (e.g. first cache line) of the first level cache. Control is then passed to step 98. Step 98 reloads the selected instruction from the second level cache to a second portion (e.g. a second cache line) of the first level cache. Alternatively, step 98 may reload the selected instruction from the second level cache back to the first portion (e.g. the first cache line) of the first level cache. In any case, the selected instruction may ultimately be provided to an instruction processor, sometimes through an Instruction Queue. Control is then passed to step 100, which re-executes the instruction.

Referring back to step 90, if the first portion (e.g. first cache line) of the first level cache has already been marked, control is passed to step 102. Step 102 increments a Degrade Counter that corresponds to the first level cache. The degrade counter may keep track of the number of degraded storage locations, cache lines and/or memory blocks in the first level cache (i.e. those that have produced two or more parity errors). Step 106 reports to the maintenance processor if the Degrade Counter exceeds a Degrade Threshold Value. The Degrade Threshold Value may be settable, such as via scan-set, by the maintenance processor. Alternatively, or in addition, step 106 may report to the maintenance processor that a portion (e.g. cache line) of the first level cache is being degraded.

Control is then passed to step 104. Step 104 degrades the first portion (e.g. first cache line) of the first level cache. Control is then passed to step 98. As noted above, step 98 reloads the selected instruction from the second level cache to a second portion (e.g. a second cache line) of the first level cache. Alternatively, step 98 may reload the selected instruction from the second level cache back to the first portion (e.g. the first cache line) of the first level cache. In any case, the selected instruction may ultimately be provided to an instruction processor, sometimes through an Instruction Queue. Control is then passed to step 100, which re-executes the instruction.

Referring back to FIG. 1, a system and method is also provided for detecting and recovering from errors in an Operand Cache Memory, such as First Level Operand Cache Memory (O-FLC) 110. In one illustrative embodiment, when an instruction in the instruction pipeline requests an operand from the O-FLC 110, a Parity Error Detector 112 determines whether the requested operand has a parity error. If the operand does have a parity error, a Parity Error Handler, such in Parity Error Handler 34, may halt execution of the instruction that requested the corrupted operand (and sometimes instructions thereafter), mark the location in the O-FLC 110 that stored the operand that had the parity error via Valid/Downgrade Block 40, refetch the operand from a Second Level Cache (SLC) 20 and store it in the O-FLC 110, and re-execute the instruction that requested the corrupted operand. In some cases, the instruction that requested the corrupted operand may already be at the second 114 or third 116 pipeline stage in the Pipelined Stages 12. In some cases, the instruction may be moved back to the First Pipeline Stage 46 when re-executed, if desired.

As noted above, and in some embodiments, the location of the operand in the O-FLC 110 that included the parity error may be marked, such as by setting a valid flag for that location to zero. When the corrupted operand is reloaded into the O-FLC 110, the operand may be reloaded into the same or a different location within the O-FLC 110. Subsequently, if an operand is read from a marked location of the O-FLC 110, and a parity error is again detected by parity error detector 112, the marked location (or in some cases, a block of locations) may be degraded. Such a situation may indicate a hard error at that memory location, rather than just a soft error. While this example downgrades the memory location (or in some cases, a block of locations) in the O-FLC 110 after a second operand that has a detected parity error is read from the memory location, it is contemplated that a memory location may be downgraded after any number of operands that have a detected parity error are read from the memory location (e.g. 2, 3, 4, 5, etc.).

Figure 6:
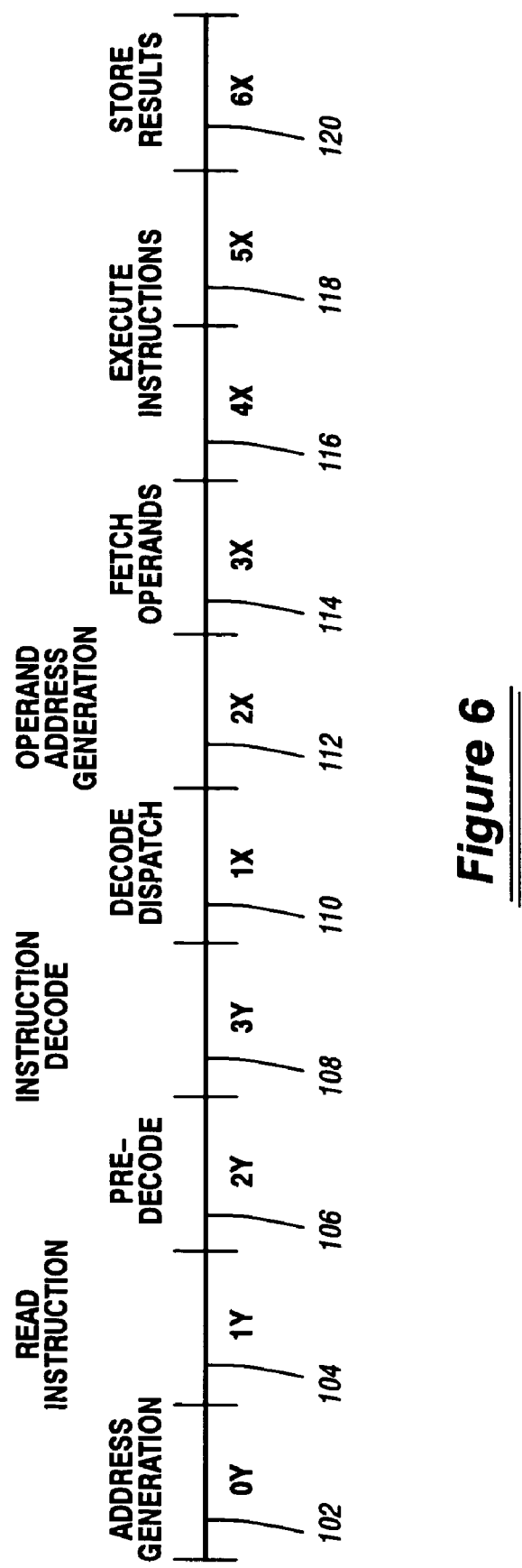
FIG. 6 is a timing diagram showing pipelined execution of an instruction by an illustrative Instruction Processor (IP)

In some illustrative embodiments, the number of downgraded memory locations in the O-FLC 110 may be tracked and/or counted. In some cases, if the number of downgraded memory locations in the O-FLC 110 exceeds a threshold number, a report may be sent to the Maintenance Processor 42. The Maintenance Processor 42 may track how many and/or which portions (e.g. cache lines) of the O-FLC 110 have been marked and/or degraded. In some cases, the Maintenance Processor 42 may determine that the O-FLC 110 may need to be replaced during a next scheduled maintenance period. Meanwhile, however, the data processing system may continue to operate normally. Another illustrative embodiment of the present invention is shown and described with reference to FIGS. 6-13. FIG. 6 is a timing diagram showing pipelined execution of an instruction by an illustrative pipelined Instruction Processor (IP). As described briefly above, pipelined instruction execution is a method of increasing system throughput by dividing the execution of each instruction into functional operations that can be performed within different logic sections of the IP. Since each logic section of the IP can be processing somewhat independently from the other logic sections, the IP can be executing portions of several instructions at one time so that instruction execution is overlapped.

The timing diagram of FIG. 6 shows a standard instruction being divided into ten functional operations. Each of these functional operations may be referred to as stage of execution. For the illustrative instruction processor, during the first stage, designated "0Y" stage labeled 102, address generation occurs for the instruction. Next, the instruction is retrieved from an instruction cache memory during the "1Y" stage, labeled 104. Following instruction retrieval, decode of the instruction begins during the pre-decode stage shown as "2Y" stage and labeled 106. Instruction decode continues during "3Y" stage labeled 108. During "1X" stage, labeled 110, the decoded instruction signals are dispatched to the various logic sections of the IP that perform instruction execution. The "2X" stage, which is labeled 112, is utilized primarily to generate any operand address that is required for instruction execution. During the "3X" stage, which is labeled 114, the operand address is used to fetch the operand from an operand cache memory. The "4X" and "5X" stages, labeled 116 and 118, respectively, are generally devoted to executing the operations specified by the decoded instruction, and the "6X" stage labeled 120 is used to store any results from the instruction execution.

In the pipeline architecture represented by the timeline of FIG. 6, 0Y, 1Y, 2Y, and 3Y stages may be considered "instruction fetch and pre-decode" stages, and the actual instruction execution may occur during the 1X through 6X stages. Since in this example, six standard instructions may be executing simultaneously during the 1X through 6X stages, the illustrated pipeline architecture is said to represent a six-deep instruction pipeline. That is, while a first instruction undergoes decode dispatch during the 1X stage, operand address generation occurs for a second instruction during the 2X stage. At the same time, operands for a third instruction are being retrieved, execution is occurring for fourth and fifth instructions, and any results produced by instruction execution are being stored for a sixth instruction.

Figure 7:
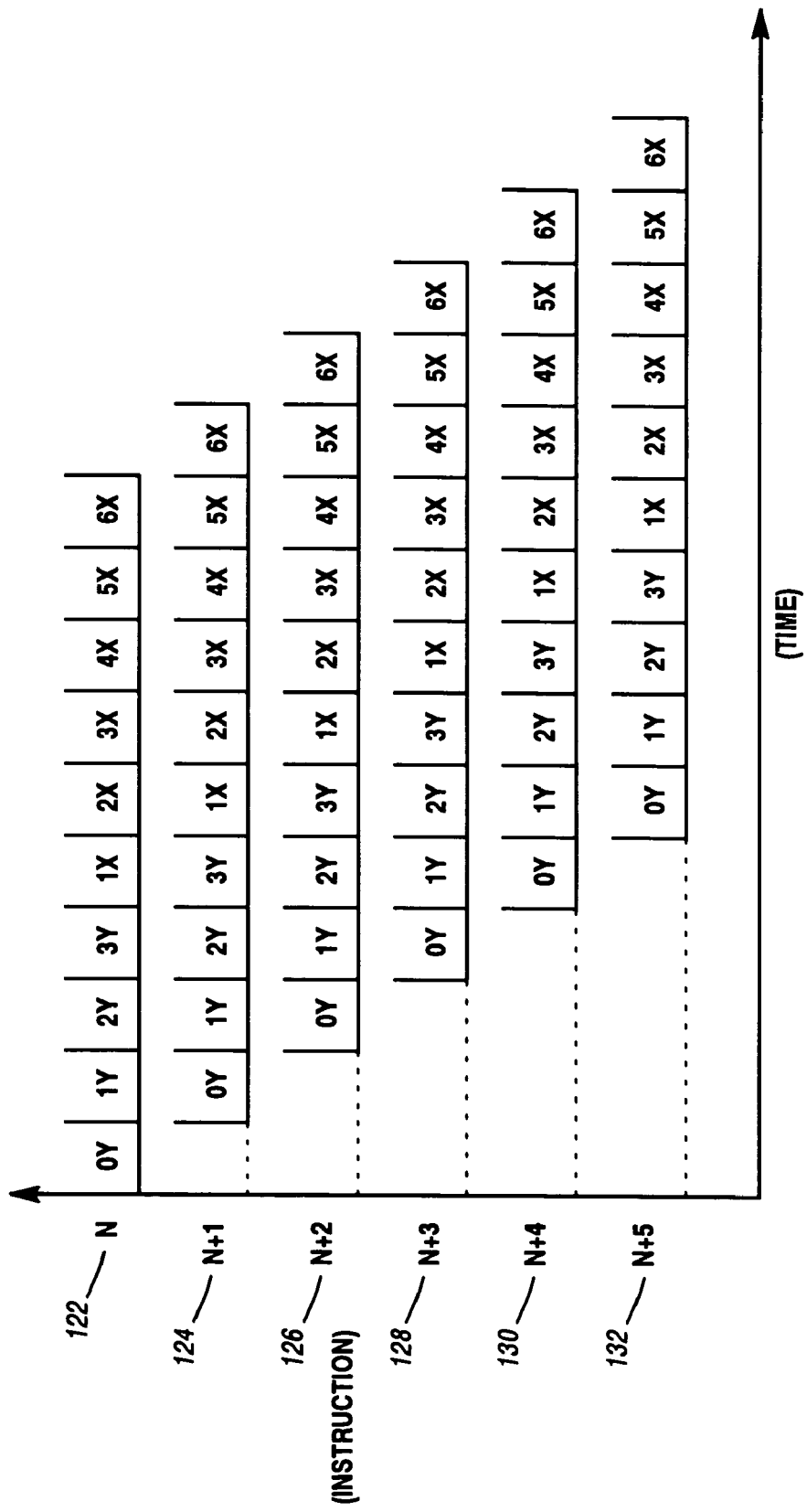
FIG. 7 is a timing diagram illustrating the pipeline instruction overlap of six consecutive standard instructions, N through N+5, in an instruction pipeline having the stages shown in FIG. 6.

FIG. 7 is a timing diagram illustrating the pipeline instruction overlap of six consecutive standard instructions N through N+5 in an instruction pipeline having the stages shown in FIG. 6. Waveforms representing execution of these six instructions are labeled 122, 124, 126, 128, 130, and 132 respectively. The diagram represents fully overlapped execution for the four stages of instruction fetch and pre-decode 0Y through 3Y, and the six stages of instruction execution 1X through 6X. When instruction execution is "fully overlapped", one instruction completes every stage. In one embodiment, each pipeline stage is one cycle of the system clock in length. In fully overlapped mode, each instruction that is not yet complete advances to a next stage of the pipeline at the start of a new clock cycle.

Figure 8:
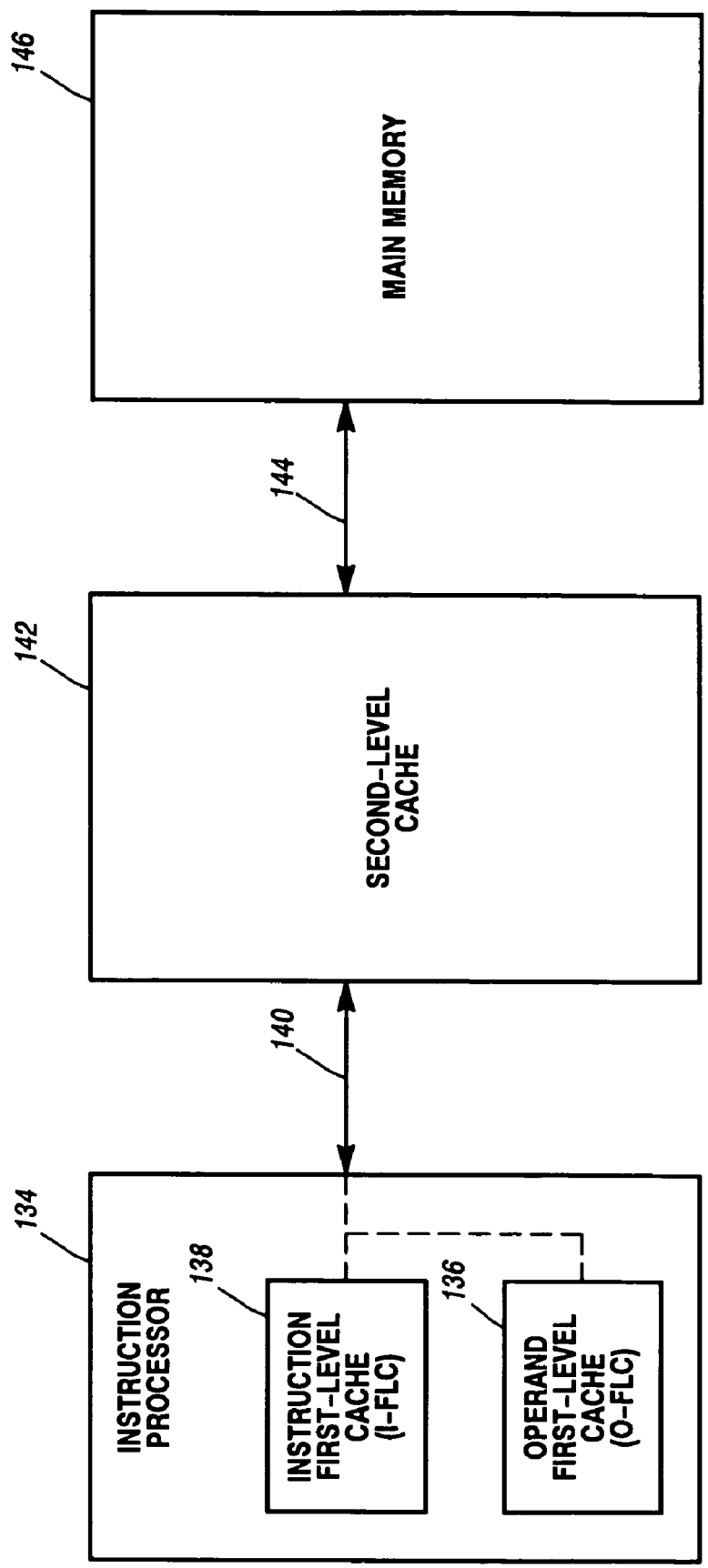
FIG. 8 illustrates the system environment of one embodiment of the current invention.

FIG. 8 illustrates the system environment of one illustrative embodiment of the present invention. The illustrative Instruction Processor (IP) 134 includes both an Operand First-Level Cache (O-FLC) 136 and an Instruction First-Level Cache (I-FLC) 138. The O-FLC 136 and I-FLC 138 are relatively small, fast, memories for storing recently-used operands and instructions, respectively, in a manner known in the art, to speed instruction execution within the IP 134.

I-FLC 138 and O-FLC 136 are coupled via Interface 140 to a Second-Level Cache (SLC) 142 storing both instructions and operands. Requests for instructions or operands are made to the SLC when the instructions or operands are not located within the I-FLC 138 or the O-FLC 136, respectively. Similarly, the SLC 142 is coupled via Memory Interface 144 to additional storage shown as Memory 146. When a request is made to the SLC for an item not stored in the SLC, the request is forwarded to Memory 146 for processing. In one embodiment, Memory 146 includes both a third-level cache and a main storage unit. The implementation details of Memory 146 are beyond the scope of this application.

Figure 9:
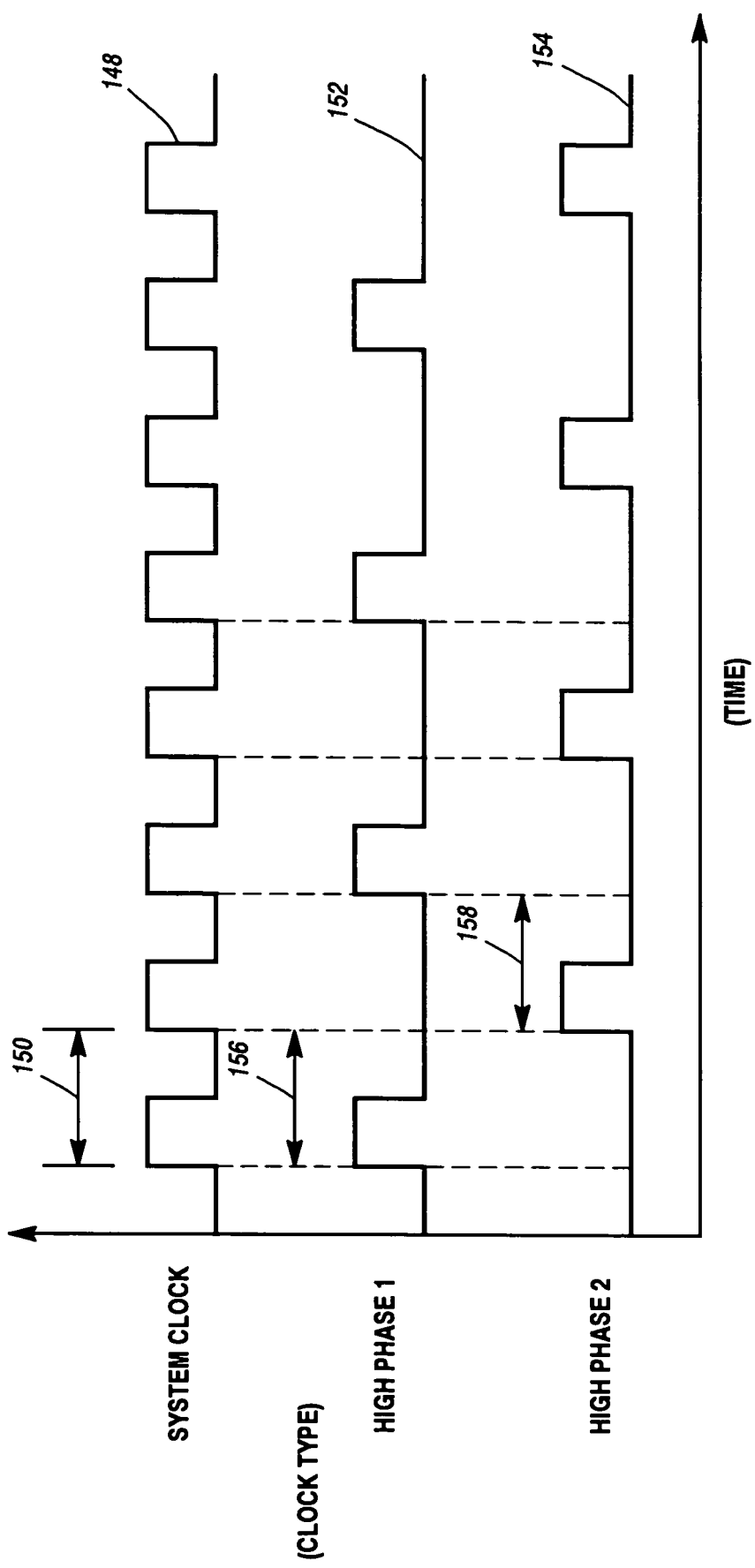
FIG. 9 is a timing diagram illustrating the clock signals associated with the IP logic of the preferred embodiment.

FIG. 9 is a timing diagram illustrating the clock signals associated with the IP logic of one illustrative embodiment of the present invention. The system clock shown in waveform 148 has a predetermined clock period 150. This system clock is used to generate all other clock signals in the system using a clock-generation scheme that is well-known in the art. Two of the clock signals used within the IP logic are represented by waveforms High Phase 1, labeled 152, and High Phase 2, labeled 154. The system clock periods associated with the high clock pulse of High Phase 1 and High Phase 2 can be referred to as Phase 1, labeled 156, and Phase 2, labeled 158, clock periods, respectively.

Figure 10:
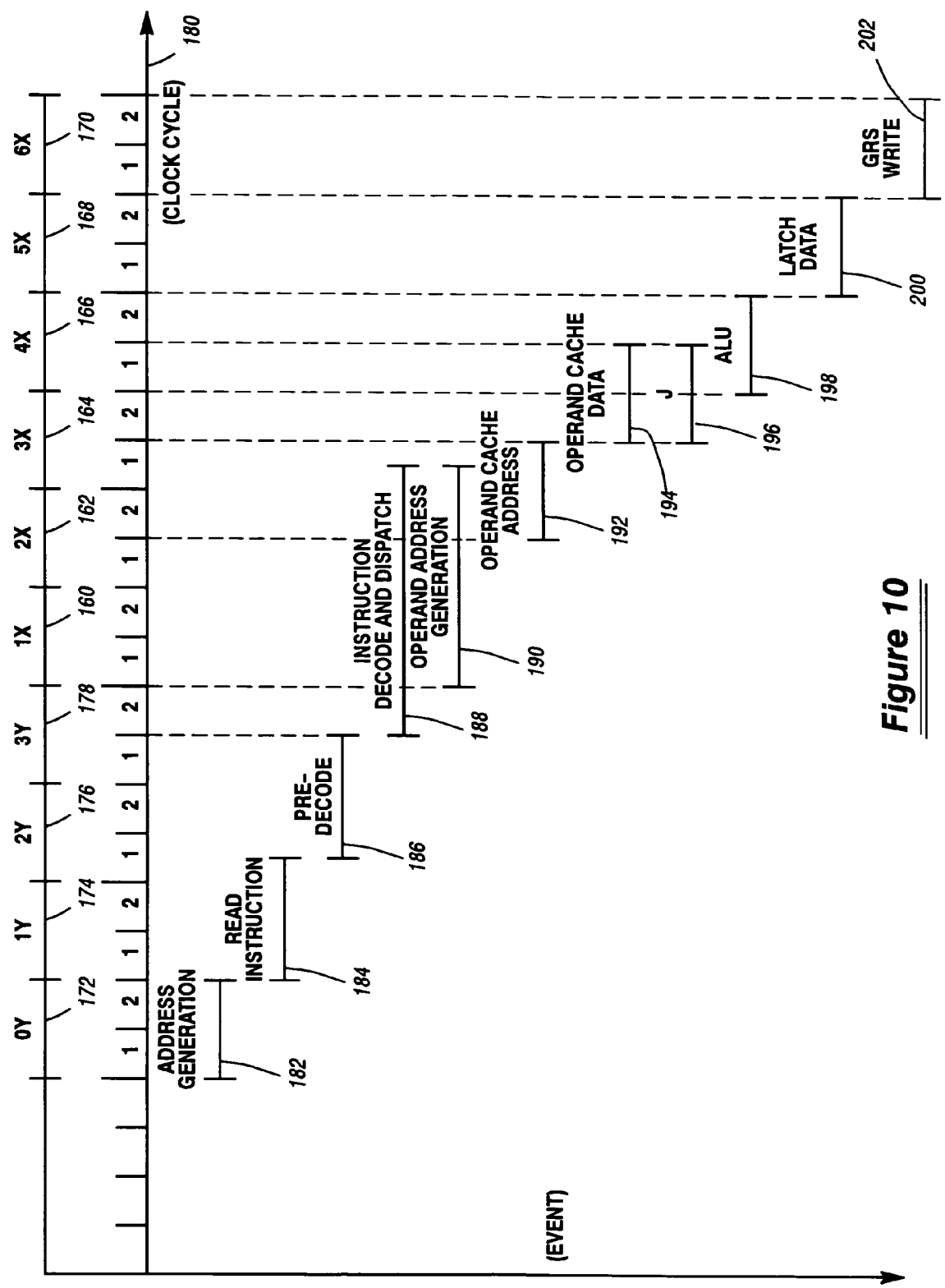
FIG. 10 is a timing sequence diagram illustrating the sequencing of a standard instruction through the instruction pipeline of the preferred embodiment.

FIG. 10 is a timing sequence diagram illustrating the sequencing of a standard instruction through the instruction pipeline of the illustrative embodiment of the present invention. The six stages of execution, designated stages 1X through 6X described above, are labeled stages 160, 162, 164, 166, 168, and 170, respectively. The four additional instruction fetch and pre-decode stages 0Y through 3Y are label 172, 174, 176, and 178, respectively. Each of these stages is shown to have both a Phase 1 and a Phase 2 cycle, as is illustrated on line 180. Hereinafter, a phase within one of the stages is referenced by indicating the stage following by the phase. For example, phase 1 of stage 1X is referred to as "1X1".

As mentioned above, and as illustrated by line 182, address generation for an instruction occurs in the 0Y stage. This address is used to fetch the instruction from memory. In most situations, when the addressed instruction is located in the I-FLC 138, the instruction is read from the I-FLC 138 during the 1Y stage, as shown by line 184. The instruction is provided to pre-decode logic that begins the instruction decode process in the 2Y stage, as illustrated by line 186. Instruction decode continues during the 3Y stage, and decoded instruction signals are provided to various logic sections of the IP during the 1X stage. This is illustrated by line 188.

Additionally, operand address generation begins during the 1X stage for any operands required by the instruction as displayed by line 190. By 2X2, the operand cache address is available for presentation to the O-FLC 136 as shown on line 192. At time 3X2, data from the O-FLC 136 is available as illustrated by line 194. Line 196 represents "per J shifting", which is an operation performed to select partial or full word operands as specified by the instruction.

At time 4X1, the Arithmetic Logic Unit (ALU) receives any fetched operand to be processed by the instruction, and may also receive operand data retrieved from one of the registers included within an internal IP register set called the General Register Set (GRS). The ALU processes the data during the 4X stage, and the results are latched during the 5X stage. This is shown by lines 198 and 200, respectively. Finally, data is written back to the GRS during the 6X stage, as displayed by line 202.

The timing sequence discussed above is a general illustration of the manner in which an instruction moves through the illustrative instruction pipeline. The above discussion assumes that a "standard" (that is, a "non-extended") instruction is being executed, and that the instruction requires some ALU processing to occur. It will be remembered that instruction sequences vary depending on the type of instruction being executed, and the functions and timing associated with the hardware sequences will therefore also vary somewhat. The above discussion also assumes the addressed instruction and required operands are available in the I-FLC 138 and O-FLC 136, respectively. If this is not the case, processing delays may result, since one or more instructions and/or operands must be retrieved from Memory 146.

As mentioned above, FIG. 10 illustrates the execution of a "standard" (non-extended) instruction. This means that no additional microcode processing is necessary to complete execution of the instruction. Other instructions require that instruction execution be at least partially carried out under the control of a Micro Sequencer within the IP. This Micro Sequencer executes IP microcode that controls the various logic sections of the IP. When this type of execution is required, additional "extended-mode" stages must be inserted into the instruction processing time-line. This increases the time required for an instruction to complete execution, and also suspends the overlap of instruction execution within the IP pipeline.

Figure 11:
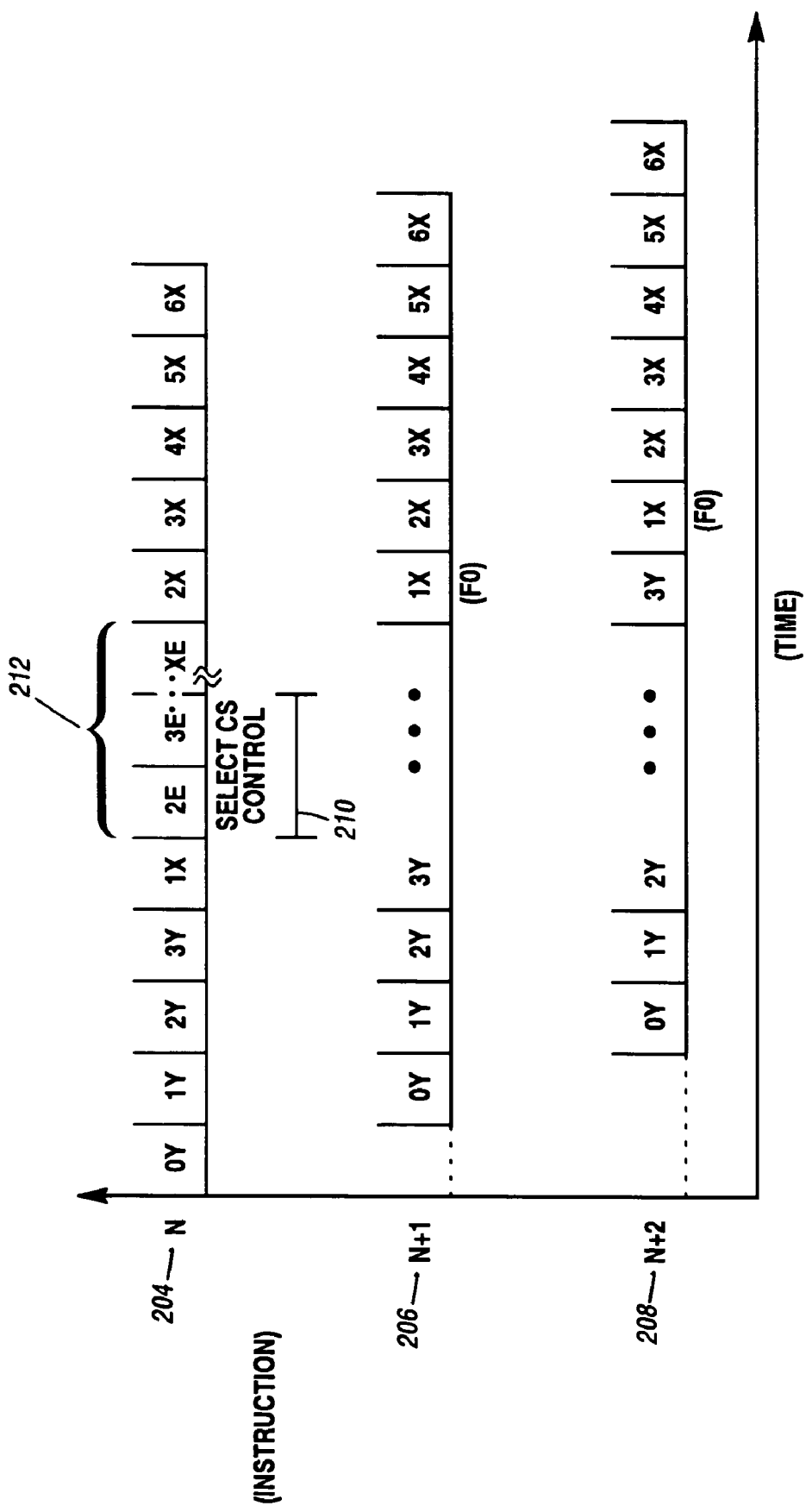
FIG. 11 is a timing diagram illustrating the suspension of instruction execution within the pipeline when an extended-cycle instruction is executed.

FIG. 11 is a timing diagram illustrating the suspension of instruction execution within the pipeline when an extended-cycle instruction is executed. Three consecutive instructions N 204, N+1 206, and N+2 208 are shown. Instruction N 204 is the extended-cycle, or "extended-mode", instruction. During execution of an extended-mode instruction, a control signal called "Select CS Control" is activated during phase 2 of stage 1X, as indicated by line 210. The activation of Select CS Control prevents the decoded instruction signals for instruction N+1 206 from being dispatched to the various IP logic sections during stage 1X of instruction N+1. This allows execution to continue under microcode control on the Nth instruction for a variable number of additional cycles 212. These additional cycles are illustratively shown as 2E, 3E, and 4E, but more or fewer extended cycles could occur. The Select CS Control signal remains active until the beginning of the last additional cycle, as shown by line 210. After the Select CS Control signal deactivates, the next instruction N+1 206 can be loaded for decode and normal pipeline execution is resumed.

Figure 12:
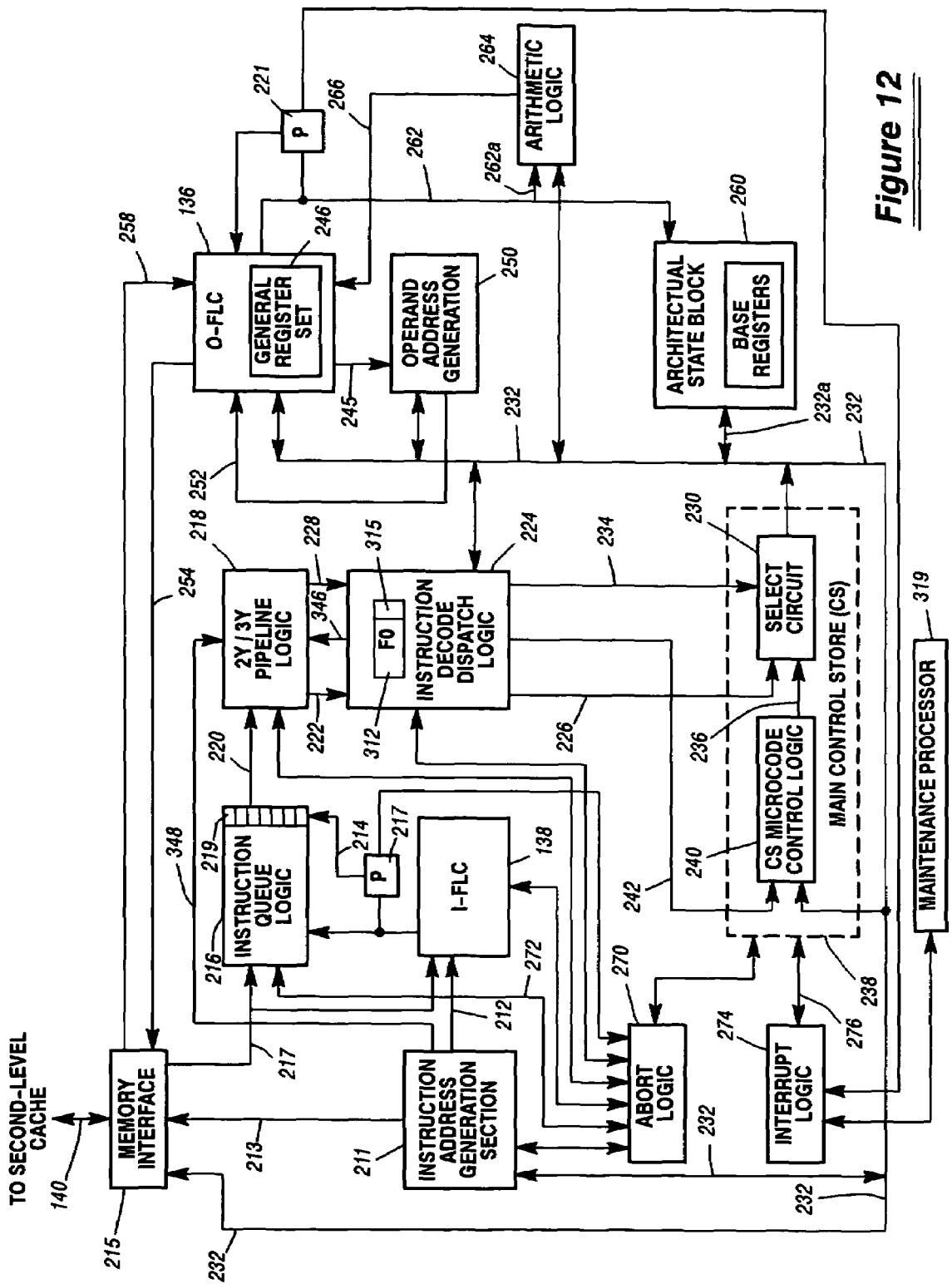
FIG. 12 is a block diagram of the major sections of an Instruction Processor of the preferred embodiment.

FIG. 12 is a block diagram of the major sections of one embodiment of Instruction Processor (IP) 134. Although this diagram does not provide a complete view of all data, address, and control paths, a subset of these paths is shown to facilitate an understanding of how the various IP sections interact.

The IP includes an Instruction Address Generation Section 211 that provides logic that generates an absolute instruction address by adding a relative address to the address of a designated base register within the IP. The absolute instruction address is provided to a tag memory (not shown in FIG. 12) to determine if the addressed instruction is located in the I-FLC 138. If the instruction is resident in the I-FLC 138, the address is provided on line 212 to the I-FLC so that the addressed instruction may be retrieved and provided on line 214 to the Instruction Queue Logic 216. If the address is not resident in the I-FLC, the address is provided on line 213 to Memory Interface 215, which forwards the address on line 140 to the Second-Level Cache 42 (FIG. 8). When the instruction becomes available, it is provided to the I-FLC and forwarded to the Instruction Queue Logic 216 on line 217. In general, an instruction is stored in Instruction Queue Logic 216 prior to entering the 2Y and 3Y stages of the pipeline. Instruction Queue Logic 216 includes a storage device that stores a predetermined number of instructions, which in some cases, may be eight. A next instruction may be selected from the Instruction Queue Logic 216 by providing an address to the Instruction Queue Logic 216. If the Instruction Queue Logic 216 does not store a desired instruction, the desired instruction is read from the I-FLC 138, and the instruction read from the I-FLC 138 is provided immediately to the pre-decode logic without first being stored in the Instruction Queue Logic 216.

Pre-decode and decode of an instruction during the 2Y and 3Y stages, respectively, are performed by the 2Y/3Y Pipeline Logic 218. This logic receives an instruction from the Instruction Queue Logic 216 via the interface shown as line 220. This logic performs the decode operations that generate the hardware signals to control instruction execution. The 2Y/3Y Pipeline Logic 218 will be discussed in more detail below.

2Y/3Y Pipeline Logic 218 provides hardware signals on line 222 to Instruction Decode Dispatch Logic 224 at time 1X1, which, in turn, forwards these signals to the rest of the IP on line 226. Additionally, 2Y/3Y Pipeline Logic provides the instruction on line 228 to Instruction Decode Dispatch Logic 224 so that this instruction can be stored, and further decode operations can be performed by Instruction Decode Dispatch Logic 224 to generate additional hardware control signals.

For standard instructions, the signals provided by Instruction Decode Dispatch Logic 224 via line 226 are selected by Select Circuit 230 to be provided to all parts of the IP on line 232. As discussed previously, these signals provide the hardware control sequences necessary to complete execution of the standard instruction. Selection of the signals on line 226 is controlled by the Select CS Control Signal on line 234 generated by the Instruction Decode Dispatch Logic 224. For non-standard, extended-mode instructions, the Select CS Control Signal instead selects signals on line 236 to be provided to the various IP logic sections. The signals on line 236 are generated by Main Control Store (CS) section 238.

Figure 13:
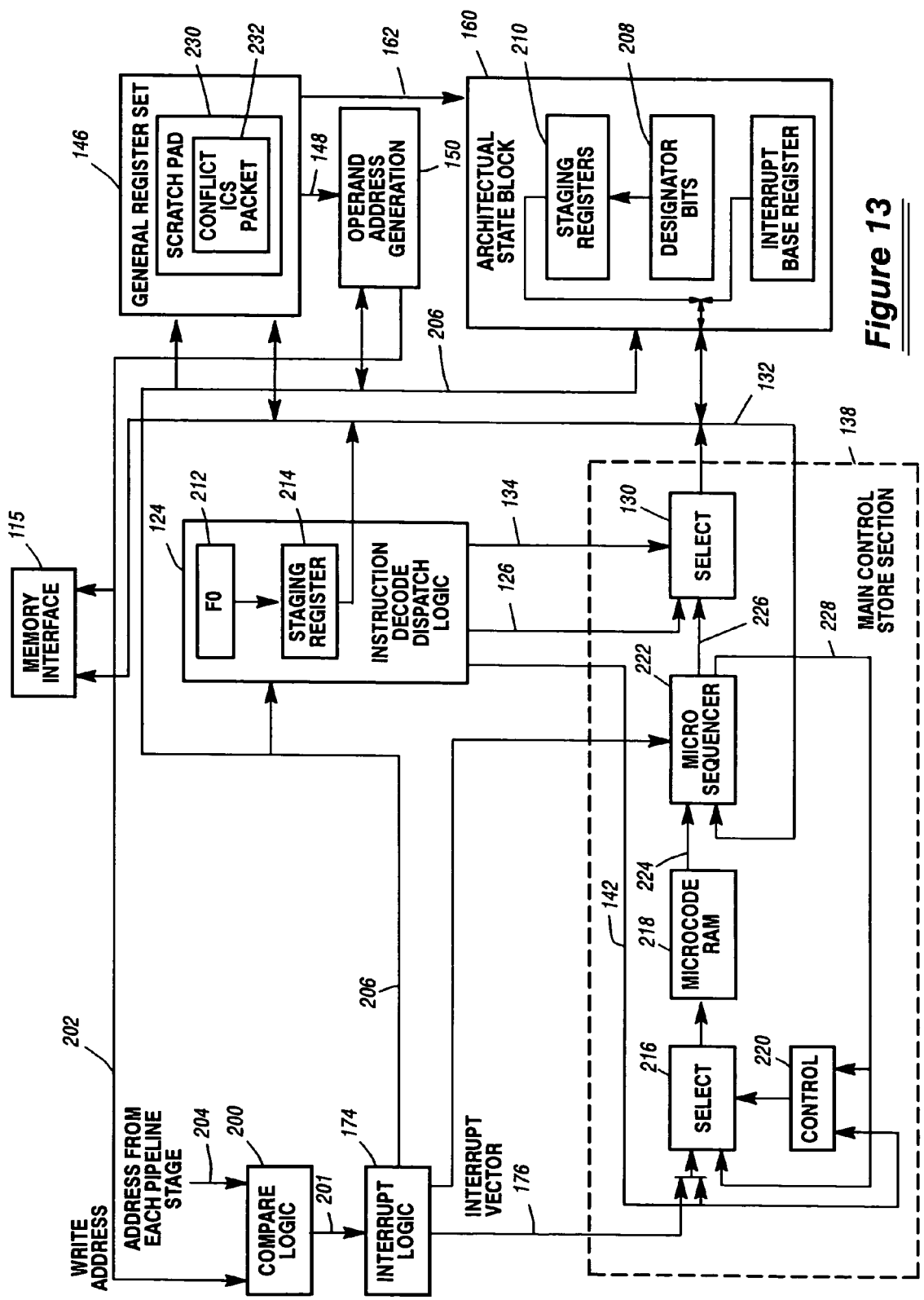
FIG. 13 is a logic block diagram of the Instruction Processor illustrating main control store logic in more detail.

Main Control Store Section 238 includes CS Microcode Control Logic 240, which is a microcode-controlled sequencer that is initially enabled by address and control signals provided on line 242 from Instruction Decode Dispatch Logic 224. The microcode-controlled sequencer executes microcode instructions stored within a control store memory device (not explicitly shown in FIG. 12, but is shown in FIG. 13) embedded within the Main Control Store Section 238. The signals on line 236, which may be the output data from the control store memory, are selected by select circuit 230 to control IP execution during the extended execution cycles for non-standard instructions. For more information on microcode-controlled pipeline execution of extended-mode instructions, see U.S. Pat. No. 5,577,259 to Alferness et al. entitled "Cooperative Hardware and Microcode Control System for Pipelined Instruction Execution", assigned to the assignee of the current invention.

As stated previously, the control signals on line 232 are provided to all sections of the IP to control instruction execution. Some of these control signals are used to access the General Register Set (GRS) 246 to retrieve operand indexes, which are then provided over lines 245 to the Operand Address Generation Section 250. In response, the Operand Address Generation section 250 generates an operand absolute address, which is transferred to the Operand First-Level Cache (O-FLC) 136 on lines 252. After the absolute operand address has been received by the O-FLC 136, the O-FLC logic determines whether the addressed operand is resident in the O-FLC. If the operand is not resident, the IP suspends instruction execution and initiates a memory read over lines 254 to the Memory Interface 215. In response, Memory Interface initiates a request to the SLC 142 over Interface 140. After the operand is returned on Interface 140 to Memory Interface, the operand is provided to the O-FLC 136 on line 258.

If an O-FLC hit occurs, or after execution has resumed in the case of an operand cache miss, the operand data is available at 3X2 time (see FIG. 10). This data is provided to the Architectural State Block 260 over interface 262. Depending upon the instruction execution, this data may be used in conjunction with the addressing signals provided on line 232a to generate the next operand cache address. Operand data is further made available over line 262a to the Arithmetic Logic 264 during the end of the 3X stage. The Arithmetic Logic 264 performs the multiply/divide, floating point, decimal and/or other arithmetic operations for the machine during the 4X stage. The results are stored back to GRS 246 over line 266 during the 6X stage.

The above description provides an overview of the manner in which control typically passes between the various IP logic sections of the illustrative IP during pipelined execution of an instruction. In some cases, this instruction execution is interrupted because of the detection of an error or some other occurrence that re-directs the flow of instruction execution. This type of situation is handled by Abort Logic 270.

Abort Logic 270 both receives, and provides, signals from/ to each of the other logic sections, including, but not limited to, Instruction Address Generation Section 211, Instruction Queue Logic 216, I-FLC 138, 2Y/3Y Pipeline Logic 218, Instruction Decode Dispatch Logic 224, and Main Control Store Logic 238. For ease of reference, interfaces between Abort Logic 270 and other logic sections are not shown. It will be understood, however, that Abort Logic 270 also receives signals from the remaining logic sections including O-FLC 136, Operation Address Generation Section 250, Arithmetic Logic 264, and Architectural State Block 260.

In general, Abort Logic 270 monitors the other logic sections for the occurrence of errors or other abnormal situations that will require that the flow of instructions through the pipeline be modified or halted. As an example, assume that an instruction is read from I-FLC 138 into Instruction Queue Logic 216 in preparation for execution. A parity error is detected on this instruction after that instruction is resident in the pipeline. In response, parity error detection circuitry included within Instruction Queue Logic 216 will send a signal to I-FLC 138 via interface 214 indicating that a parity error was detected on the fetch address, causing I-FLC to invalidate that data in cache.

In addition, Abort Logic 270 may also receive notification of the error from Instruction Queue Logic 216 on line 272. Abort Logic 270 will provide signals to Instruction Queue Logic 216 to cause the corrupted instruction to be discarded. Abort Logic 270 will also generate signals to Memory Interface 215 to cause an uncorrupted copy of the instruction to be retrieved from SLC 142 or Memory 146. In addition, since the instruction will not be available in time to begin decode within 2Y/3Y Pipeline Logic 218 at the time that decode would have otherwise taken place, Abort Logic 270 must generate signals that stop some of the instructions from advancing within the pipeline. That is, and in some embodiments, Abort Logic 270 allows all instructions ahead of the corrupted instruction within the pipeline to continue to advance in a normal manner, but the remaining instructions are prevented from advancing until an uncorrupted copy of the instruction is available. The pipeline stages that empty during this time are put into a stalled state so that errors do not occur. When the instruction finally becomes available via Memory Interface 215, it is allowed to enter the pipeline so that normal processing resumes.

Another similar situation arises when a cache miss occurs to the I-FLC 138. When an instruction is unavailable within the I-FLC 138, Abort Logic 270 allows all instructions that have already entered the pipeline to continue to advance normally. As the initial pipeline stages empty because instructions are no longer available from I-FLC 138, Abort Logic places these stages in a stalled state so errors do not occur. When the unavailable instruction is retrieved from either Second-Level Cache 142 or Memory 146, the instruction enters the pipeline so that overlapped instruction execution may resume.

Yet another type of situation that triggers Abort Logic 270 may be the detection within the pipeline of certain instruction combinations. For instance, when an instruction N is generating an operand that will be used by the next instruction N+1 within the instruction stream, the operand may not be available in time for use by instruction N+1. As an example, instruction N may be completing the storing of the operand within GRS 246 at the same time instruction N+1 is attempting to read that operand from these registers, leading to erroneous results. In one embodiment, Abort Logic 270 prevents an error from occurring by detecting the instruction combination, and then causing a "cycle slip" to occur. In other words, instead of following immediately behind instruction N in the pipeline, instruction N+1 will be two stages behind, with the stage between instructions N and N+1 being empty. This allows the operand to be generated by instruction N in time for its use by instruction N+1. If needed, multiple cycles may be slipped such that a predetermined number of stages of the pipeline are empty between instructions N and N+1.

Another approach to the foregoing problem involves providing special "wrap-back" paths that can be enabled when an instruction combination of the above-described type is detected. For example, a special data path may be provided to direct data from one of the registers of GRS 246 to a different register in an expedited manner that allows an instruction N+1 to use the data even if it is being generated by the previous instruction. This wrap-back path is enabled by Abort Logic 270 upon the detection of the instruction combination.

The examples discussed above are merely several of the many types of occurrences that can trigger the activation of Abort Logic 270 and the associated circuitry such as the wrap-back paths. As may be evident, Abort Logic 270 must include specialized logic not only to recognize each of the occurrences, but also to generate the appropriate logic sequences to handle each situation. In addition, each type of occurrence generally requires that the correct signals be transferred to, and from, Abort Logic 270 to the various other logic sections. Thus, using Abort Logic 270 and the associated circuitry to control the pipeline for all non-standard occurrences can be very logic intensive. This increases the size of the design, and lengthens design and test cycles.

FIG. 12 also includes Interrupt Logic 274. Like Abort Logic 270, Interrupt Logic 274 receives signals from, and provides signals to, every logic section in the IP. Most of these signal interfaces are not shown in FIG. 12 for ease of reference. Interrupt Logic 274 generates an interrupt that is used to re-direct machine execution to a different address. For instance, the interrupt may cause the interruption of execution of the current instruction stream so that execution is re-directed to code that is part of the operating system. As an example, if a divide-by-zero operation is attempted, an interrupt signal from Arithmetic Logic 264 is provided to Interrupt Logic 274, which then saves the current state of the IP, and thereafter re-directs machine execution to special interrupt handling code that is part of the operating system. This interrupt handler is designed to address the situation that resulted in the interrupt. When execution of that special code is complete, the saved state of the machine is re-stored so that execution may continue with the original instruction stream.

The hardware mechanism that is used to generate the interrupt is as follows. When Interrupt Logic 274 detects a signal from one of the other logic sections that indicates that an interrupt is to be generated, Interrupt Logic 274 provides a signal to other logic sections to cause these logic sections to store state information in local staging registers. For example, Instruction Decode Dispatch Logic 224 saves the state of the F0 register in a staging register of Instruction Decode Dispatch Logic. Recall that this register contains the instruction that is currently in stage 1X. Similar storage operations occur within other logic sections. For example, within Instruction Address Generation Section 211, the Program Address Register (PAR) is saved to a local staging register. This register stores the address of the instruction that will next be retrieved for entry into stage 0Y.

Other state information that is stored at this time includes designator bits such as extended addressing mode bits stored within Architectural State Block 260. These bits indicate whether the machine is running in an extended addressing or other mode. In general, all information needed to determine the operating environment of the IP is stored within various staging registers of the logic sections.

In addition to storing state information, the hardware sequences block updates that might be occurring to Memory 146 or to GRS 246 by the instruction that caused the interrupt, or any subsequent instructions within the instruction stream.

After hardware sequences that are generated by the Interrupt Logic 274 are used to store state information within each of the logic sections, Instruction Decode Dispatch Logic 224 activates the Select CS Control signal of FIG. 11. This signal, which is shown on line 234 of FIG. 12, causes Select Circuit 230 to begin selecting signals generated by CS Microcode Control Logic for presentation to the rest of the IP. In this manner, CS Microcode Control Logic 240 assumes control of the IP.

As discussed above, CS Microcode Control Logic 240 includes a control store memory (e.g. RAM) and a Micro Sequencer (not shown in FIG. 12, but which is shown in FIG. 13) for executing the microcode stored within the control store memory. The Micro Sequencer generates signals on lines 236 for presentation to the rest of the IP when the Select CS Control Signal is activated on line 234. CS Microcode Control Logic 240 begins executing standard interrupt processing code which transfers all of the saved state information from the staging registers of the various logic sections to Memory Interface 215 via signals lines that are not shown in FIG. 12 for ease of reference. The saved state information is written into an Interrupt Control Stack (ICS) in Memory 146 at a standard location known to the operating system, as determined by an address provided by the CS Microcode Control Logic to the Operation Address Generation Section 250.

After the hardware state has been temporarily stored within staging registers, the signals on line 232 generated by CS Microcode Control Logic 240 flush the stages of the pipeline that contain the instruction N and all following instructions in the instruction stream. All instructions that entered the pipeline before instruction N are allowed to complete normally. This places the pipeline in an initialization state so that it is ready to begin processing of a different instruction stream.

Next, the Micro Sequencer generates an operand address from the contents of an interrupt base register retrieved from Architectural State Block 260, and further from signals received from Interrupt Logic 274 on interface 276 that indicates the type of interrupt that occurred. The contents of this operand address are used as the new PAR. Instruction Address Generation Section 211 uses the new PAR as the address from which to retrieve the first instruction of an interrupt hander. Instruction Address Generation Section begins retrieving instructions from this address for entry into the pipeline. Execution of the designated interrupt handler is thereby initiated.

To summarize the foregoing, when interrupt processing is initiated, the state of the IP may be saved to main memory, and some of the instructions that had been in the pipeline are flushed in preparation to re-direct instruction execution, sometimes under the control of the operating system. After interrupt processing is completed, the state is restored so that execution may continue with the previous instruction stream. The saving of the IP state to memory, and the subsequent restoration of the state from memory, is perform via execution of the Interrupt Logic 274 operating in conjunction with CS Microcode Control logic 240, as will be discussed in more detail below.

In some cases, when the execution of one instruction within the pipeline may affect the execution of a subsequent instruction within the pipeline in a possibly unintended way, a conflict may exist. This can be best understood by considering an example conflict situation. Assume that a current stream of instructions is self-modifying such that an instruction N residing within stage 4X of the pipeline is changing instruction N+5 that follows instruction N in the instruction stream. That is, instruction N writes an updated instruction operation code (opcode) to Memory 146 to overwrite previous instruction N+5. When this updated instruction is stored to Memory 146, the old version of instruction N+5 has already entered the fetch stages of the pipeline. This old copy of the instruction that is resident within the pipeline is not overwritten by the normal logic that stores the updated instruction to Memory 146. The old version of instruction N+5 should not be allowed to enter Instruction Decode Dispatch Logic 224 to begin execution within stage 1X of the pipeline. The new version should be executed instead or unintended results will occur.

In some cases, special circuitry is added to Abort Logic 270 to recognize the specific type of conflict situation involving self-modifying code that updates an instruction that is already resident in the pipeline. This special circuitry may be adapted to flush instruction N+5 from the pipeline, and insert the required number of cycle slips so that an updated copy of instruction N+5 can be retrieved either from a cache, or from Memory 146, depending on the memory implementation. When the updated copy of the instruction is available and resident within the pipeline, instruction execution can resume in the normal manner with the new instruction and the instructions that follow in the instruction sequence.

Another approach may use a special wrap path that provides the data that is being stored to Memory 146 directly to the affected pipeline stage. In this manner, the updated opcode is not only transferred to Memory 146, but is also stored directly to the register within the 2Y/3Y pipeline logic 218 that retains the instruction for stage 2Y. The updated instruction thereby becomes available for processing without again retrieving it from Memory 146. When using either of the foregoing approaches, the circuitry that must be added to the Abort Logic 270 or instead provided to implement the wrap path is not insignificant. This extra circuitry tends to increase the size of the design, and must be simulated and/or tested to ensure proper operation. Moreover, if circuitry must be added or modified, the change may be very costly, particularly if the circuitry is embedded within a large-scale integrated circuit such as an Application Specific Integrated Circuit (ASIC).

Instead of these logic-intensive approaches of adding dedicated hardware to the Abort Logic 270 and associated circuitry, another approach leverages some of the existing functionality of Interrupt Logic 274 and Main Control Store Section 238 to address some conflicts. This can best be understood in reference to the logic diagram of FIG. 13.

FIG. 13 is a logic block diagram of IP 134 illustrating the Main Control Store Logic 238 in more detail. Assume that instruction N described above is in stage 4X such that Operand Address Generation Logic 250 is generating an address that will overwrite an instruction within Memory 146. The instruction being modified happens to also be resident within the pipeline. This conflict situation must be addressed to prevent erroneous system operation. The conflict is detected by compare logic 300, which receives address values from operand address generate logic 250 on lines 302, and which also receives pipeline instruction addresses from all of the other pipeline stages on lines 304.

When this type of conflict is detected, an indication of the particular conflict is provided on line 301 to Interrupt Logic 274. In response, Interrupt Logic 274 provides an indication that an interrupt occurred on line 306. This signal is provided to all of the logic sections of the IP. This is the same signal provided to the logic sections during conventional interrupt processing.

When a logic section of the IP receives an interrupt indication, sequences are activated within all applicable logic sections to cause predetermined state bits to be stored within the respective staging registers. For instance, the signals on lines 306 cause Architectural State Block 260 to transfer Designator Bits 308 into Staging Registers 310. Likewise, the signals on lines 306 cause Instruction Decode Dispatch Logic 224 to store F0 register 312 into Staging Register 314, and so on. Depending on the embodiment, some, or all, of the logic sections shown in FIG. 12 have similar sequence logic that, when enabled, initiates the storing of state information into respective staging registers.

Activation of Interrupt Logic further causes Instruction Decode Dispatch Logic 224 to activate operation of Main Control Store Section 238 as follows. As noted above, during the normal instruction execution, Instruction Decode Dispatch Logic is driving decoded hardware signals on lines 226 that are selected by Select Logic 230 to be provided to the remaining sections of the IP on lines 232. Thus, Instruction Decode Dispatch Logic 224 is controlling execution of the IP during normal (standard-mode) instruction execution. However, after the indication of the interrupt is received by Instruction Decode Dispatch Logic 224, this logic may provide address signals on lines 242 to Select Circuit 316 to address Microcode RAM 318, thereby allowing Main Control Store Section 238 to assume control over the IP for interrupt processing. In particular, the address signals that are provided on lines 242 by Instruction Decode Dispatch Logic 224 are concatenated with an interrupt vector provided by Interrupt Logic 274 on lines 276. The concatenated signals form an address that are selected via Select Circuit 316 via Control Logic 320 and provided to Microcode RAM 318.

The address signals that are provided to Microcode RAM 318 are used to read microcode instructions for the specific type of interrupt that occurred, as indicated by the vector on lines 276. In the case of a conflict according to the current example, the vector on line 276 indicates that a conflict, rather than an interrupt, was detected. The interrupt handling microcode stored within microcode RAM 318 is therefore used in a non-conventional manner to handle this occurrence, as follows.

The first retrieved microcode instruction for the conflict is provided to Micro Sequencer 322 on lines 324. Micro Sequencer 322, which includes sequencer logic, is controller by the microcode instruction on lines 324 to generate signals on lines 326. These signals on lines 326 are selected by Select Circuit 230 and the activation of the CS control signal on line 234. In this manner, Micro Sequencer 322 provides signals to the other IP logic sections on lines 232.

In addition to providing the signals on lines 326, Micro Sequencer 322 further generates signals on lines 328, some of which are provided to Control Logic 320, and others of which are forwarded to Select Circuit 316. The signals on line 328 that are provided to Select Circuit 316 may be selected by Control Logic 320 as the next address provided to Microcode RAM 318. In this manner, the next microcode instruction of the conflict handler is retrieved for presentation to Micro Sequencer 322, and so on. Main Control Store Section 238 thereby assumes control over the IP.

During conventional (non-conflict) interrupt processing described above, the signals provided on lines 232 by Main Control Store Section 238 may cause the hardware state that had been saved in the staging registers to be transferred from their staging registers to Memory Interface 215. From there, the signals may be transferred to Memory 146 and stored as a Conflict ICS Packet for use by, for example, the operating system during interrupt processing. In contrast, during special processing for the conflict situations, the microcode routine generates slightly different signals that transfer the staged hardware state from the staging registers to Scratch Pad 330 of GRS 246. For instance, the designator bits of Architectural State Block 260 may be read from Staging Registers 310 onto special lines of interface 232 and are stored into Scratch Pad 330 of GRS 246. Similarly, activated signals on interface 232 may cause the staged F0 value in Staging Register 314 to be read onto interface 232 for transfer to Scratch Pad 330. In a like manner, all of the state information from the various other logic sections of FIG. 12 (some of which are not shown in FIG. 13 for ease of reference) are read from the respective staging registers for transfer into the Scratch Pad 330. In one embodiment, the saved information is formatted in the same manner as a Conflict ICS Packet that is created in Memory 146 during interrupt processing. This packet is shown as Conflict ICS Packet 332 within Scratch Pad 330.

In addition to transferring the staged state information to Scratch Pad 330, the microcode routine also generates signals on lines 232 to clear the appropriate stages of the pipeline. For some conflict processing, the instruction that was executing in the stage that detected the conflict is allowed to complete normally. All instructions following that instruction are flushed. The stages that contained the flushed instructions are set to an initialization value in a manner similar to the way these stages are cleared during interrupt processing.

After the microcode routine for the conflict situation completes the transfer of the staged state information to the Conflict ICS Packet within Scratch Pad 330 and clears the pipeline stages affected by the interrupt, the microcode routine executes a version of a User Return microcode that is executed during interrupt processing.

In some cases, during interrupt processing, an interrupt handler operating under the control of the operating system is executed to address the interrupt situation. The last instruction of this interrupt handler is generally a User Return instruction. This User Return instruction is an extended-mode instruction which executes for additional cycles 2E-XE, as shown in FIG. 11. These additional cycles operate under the control of Micro Sequencer 322 in the manner described above. During these extended cycles, the signals generated by Micro Sequencer 322 on interface 232 cause Operand Address Generation Section 250 to provide an address within Memory 146 at which the Conflict ICS Packet is stored, thereby initiating the retrieval of the hardware state that is stored within Memory 146 (FIG. 8). In addition, during some interrupt processing, Micro Sequencer provides signals on interface 232 to cause the hardware state that is retrieved from Memory 146 to be restored back to the appropriate storage devices of the IP logic sections. Finally, the PAR value that is retrieved from the Conflict ICS Packet within Memory 146 is provided to Instruction Address Generation Section 211 (FIG. 12). This address is used to retrieve the target instruction that resulted in generation of the interrupt so that processing can resume at the interrupted point.

During conflict processing, execution occurs in much the same way as that described above. However, instead of initiating the microcode for the User Return operation via a User Return instruction that enters the F0 register 312 and eventually activates Micro Sequencer 322, a copy of that User Return microcode is made for use during conflict processing. This copy of the microcode is modified slightly such that instead of causing Operand Address Generate Logic 250 to provide an address to Memory Interface 215 to initiate retrieval of the Conflict ICS Packet from Memory as is done during interrupt processing, the microcode provides signals on interface 232 to enable reading of the Conflict ICS Packet from Scratch Pad 330. The hardware signals from the Conflict ICS Packet are transferred to the appropriate storage devices of the various logic sections of the IP. For instance, the stored designator bits are read from Conflict ICS Packet 332 and transferred via interface 262 to the storage device storing Designator Bits 308 within Architectural State Block 260. Similarly, the F0 value is transferred from Conflict ICS Packet 332 to F0 Register 312. Other similar transfer operations occur to the other logic sections of the IP to restore the IP state.

When the modified User Return microcode has finally restored the hardware state in the forgoing manner and transferred the PAR to Instruction Address Generation Section 211, the Micro Sequencer 322 generates a signal on interface 232 to cause Instruction Address Generation Section 211 (FIG. 12) to begin fetching an instruction from the PAR. The instruction that was executing in the pipeline stage that detected the conflict will then be re-fetched, thereby allowing the IP to resume processing of this instruction stream.

To summarize, when a conflict or other designated situation is detected, instead of handling this situation via dedicated hardware associated with Abort Logic 270, Interrupt Logic 274 is activated. A special vector associated with the conflict or other situation causes Micro Sequencer 322 to save the hardware state in GRS 246, flush the stages of the pipeline that are associated with the conflict, restore the hardware state, and resume execution with the target instruction. This is sufficient to resolve many conflict and other situations, as can be appreciated by returning to the foregoing example involving the self-modifying code.

Assume that an instruction N in stage 4X is modifying an instruction N+5 that has already entered the pipeline. This situation is detected by Compare Logic 300 such that a conflict signal is provided to Interrupt Logic 274 on line 301. This causes the state of the IP to be saved within Conflict ICS Packet 332, and also causes the pipeline stages after instruction N to be flushed and placed in an initialization state. Instruction N completes execution in a normal manner.

Because the pipeline stages are flushed for all instructions after instruction N, the outdated copy of instruction N+5 is cleared from the pipeline. When the User Return microcode is executed to restore the state, PAR will be set to instruction N+1 such that this is the first instruction that is re-fetched from memory so that execution may resume with the interrupted instruction stream. When the time comes to re-fetch instruction N+5, the modified copy of the instruction will either be located within I-FLC 138, SLC 142, or Memory 146, depending on whether store-through or store-in caches are utilized in the system. In any event, the updated copy of the instruction will be retrieved so that operation may continue.

There is a distinction between the mechanism used to resolve conflicts or other designated situations and that used to handle standard interrupts. During standard interrupt processing, control of the system is typically turned over to the operating system. Therefore, the operating system must be aware of each type of interrupt that is being handled. Special interrupt-handling code must be developed to address each of the situations. In general, this requires that the software developer have a fair amount of understanding regarding IP architecture. Moreover, the interrupt code must be tested, a process that may be quite involved. Thus, each time a new interrupt situation is identified for handling by the operating system, a significant amount of development and test time is required to ensure the resulting code will operate as desired.

In contrast to standard interrupt processing, and in some embodiments, the current mechanism for conflict or other designated situation management may not implicate the operating system. As discussed above, control of the system may never be turned over to the operating system, but instead may be maintained by the Micro Sequencer 322 within the IP. No new code need be developed or tested. Most hardware and microcode already exists and has been tested for other purposes, significantly reducing test time. Thus, this mechanism provides an attractive alternative for addressing some conflict and other situations.

Many different conflict situations may take advantage of the current mechanism. For instance, although the foregoing discussion deals primarily with the modification of instruction N+5 by an instruction N, it will be appreciated that this method may be used to resolve conflicts occurring when instruction N is modifying any instructions that follow it in the instruction stream and that are already resident in the pipeline. Moreover, many other types of conflicts may be handled by the current system and method.

Other types of special cases that may be handled using this approach include instruction combinations wherein an instruction N is modifying an operand utilized by an instruction N+1 such that the operand will not be available at the time instruction N+1 requires its use. Instead of adding logic intensive wrap-paths that add circuitry, that will increase power consumption of the device, and that must be tested, the current mechanism may be used to flush the pipeline following instruction N so that a delay is added between instructions N and N+1. By the time instruction N+1 re-enters the pipeline following execution of the conflict-handling microcode, the operand is available and execution may continue without error.

Another advantage to the above-described mechanism involves the fact that, if desired, a logic problem that resulted in detection of the conflict may be addressed within the system microcode. That is, instead of merely saving, then restoring, the IP state to clear some of the pipeline stages, additional microcode may be executed between the saving and restoring steps to take measures to address the conflict or other situation. This microcode may, for instance, analyze the type of conflict that occurred. If a predetermined conflict type is detected, execution may be diverted via a branch microcode instruction to a microcode routine that provides a "workaround" for the problem. In this way, design problems may be addressed in microcode without the need to modify the hardware. At the end of this additional microcode, a microcode branch instruction may be so that execution continues with the standard User Return microcode that restores the machine state in the previously-described manner.

Also, it is contemplated that additional microcode may be executed following detection of a conflict to store the Conflict ICS Packet, and/or other system information, to a cache or Memory 146. The microcode to accomplish this may be very similar to that utilized during standard interrupt processing. However, instead of turning control over to the operating system after this system information is saved, as would be the case if a standard interrupt were being processed, the User Return microcode is next executed so that execution continues with instruction N+1 of the previously-executing instruction stream. The information saved to Memory may describe the type of conflict that occurred.

This data that is saved to Memory 146 or a system cache in the foregoing manner may describe the types of instructions that were in the pipeline, as well as other information regarding the state of the IP, at the time the conflict occurred. A time stamp may also be included in this stored data. This information may be periodically collected manually by software developers or other professionals, or may be harvested automatically by a software program. This data may then be employed to analyze the types, and frequency, of conflict occurrences. Using this information, software, firmware, and/or microcode may be optimized to eliminate the situations that cause the conflicts so that at least some conflict occurrences may be entirely avoided.

Another example for using the above-described mechanism involves addressing parity errors, such as parity errors on an instruction that has already entered the pipeline. Rather than requiring the use of dedicated, logic-intensive abort hardware to flush that instruction from the pipeline as may be associated with Abort Logic 270, the current mechanism may employ compare logic to raise a conflict signal to Interrupt Logic 274. This may cause the flushing of the corrupted instruction, which will have already been invalidated within I-FLC 138 and SLC 142 when the error was detected. When the operation resumes with the instruction stream following execution of the conflict microcode, an uncorrupted copy of the instruction is retrieved from Memory 146 for re-entry into the pipeline and execution may continue without error.

In addition, it should be recognized that not all of the instructions stored in the Instruction Queue 216 may be selected for execution. For example, in some cases, such as when one of the executed instructions is a jump instruction, the sequence of instruction execution may change, resulting in some of the instructions in the Instruction Queue 216 being flushed from the Instruction Queue 216 and not executed. New instructions that correspond to the new instruction flow may be loaded from the I-FLC 138 and into the Instruction Queue 216.

In one illustrative embodiment, a parity error detector 217 may be provided to detect parity errors as the instructions are read from the I-FLC 138 and provided to the Instruction Queue 216. In some embodiments, the Instruction Queue 216 may include a number of storage locations for storing a number of instructions, wherein each location has a parity error bit, generally shown at 219, that can be set if the corresponding instruction at that memory location has a detected parity error. The instruction processor may select instructions from the Instruction Queue 216 for execution. A selected instruction may be read from the Instruction Queue 216 and eventually be provided to a first execution pipeline stage 224 of the pipelined instruction processor. The parity error detector 217 may identify which of the new instructions have a parity error, and mark those instructions via the parity error bits 219 in the Instruction Queue 216.

In some illustrative embodiments, instructions read from the I-FLC 138 that have a detected parity error are provided to the Instruction Queue 216, without halting execution of the pipelined instruction processor. These instructions are merely marked as having a parity error by setting the corresponding parity error bits 219 in the Instruction Queue 216. If one of the instructions that include a parity error is actually selected for execution, and provided to 2Y/3Y Pipeline Logic 218 and eventually to the F0 register 312, then Abort Logic 270 and/or Interrupt Logic 274 may issue a parity error abort message, and the parity error may be dealt with at that time. However, some of the instructions in the Instruction Queue 216, which are marked as having a parity error, may not actually be selected for execution, and for these instructions, the instruction processor is not halted, and instruction execution is allowed to continue.

In some cases, when a parity error abort message is issued, the Abort Logic 270 and/or Interrupt Logic 274 may halt the execution of the instruction that included the parity error (and in some cases, other instructions that follow the corrupted instruction), and may cause the selected instruction to be reloaded from the SLC 142 into the I-FLC 138, and eventually to the pipelined stages of the instruction processor for re-execution. In some cases, the Abort Logic 270 and/or Interrupt Logic 274 may be adapted to accomplish this without any required interaction with the operating system.

In some embodiments, the location of the instruction in the I-FLC 138 that included the parity error may be marked, such as by setting a valid flag for that location to zero. When the corrupted instruction is reloaded into the I-FLC 138, the instruction may be reloaded into the same or a different location within the I-FLC 138. Subsequently, if an instruction is read from a marked location of the I-FLC 138, and a parity error is again detected, the marked location (or in some cases, a block of locations) may be degraded. Such a situation may indicate a hard error at that memory location, rather than just a soft error. While this example downgrades the memory location (or in some cases, a block of locations) in the I-FLC 138 after a second instruction that has a detected parity error is read from the memory location, it is contemplated that a memory location may be downgraded after any number of instructions that have a detected parity error are read from the memory location (e.g. 2, 3, 4, 5, etc.).

In some illustrative embodiments, the number of downgraded memory locations may be tracked and/or counted. In some cases, if the number of downgraded memory locations in the I-FLC 138 exceeds a threshold number, a report may be sent to a maintenance processor 319. The maintenance processor 319 may track how many and/or which portions (e.g. cache lines) of the I-FLC 138 have been marked and/or degraded. In some cases, the maintenance processor may determine that the I-FLC 138 may need to be replaced during a next scheduled maintenance period. Meanwhile, however, the data processing system may continue to operate normally.

In some illustrative embodiments, the I-FLC 138 may provide a selected instruction directly to a first stage 312 of the pipelined instruction processor. In this embodiment, Instruction Queue 216 may not be provided, or the selected instruction may bypass the Instruction Queue 216. In these cases, the selected instruction may be selected directly from the I-FLC 138, and not Instruction Queue 216 as described above. In one illustrative embodiment, each location of the I-FLC 138 may include a parity error bit that is set if the instruction at that memory location has a detected parity error. The pipelined instruction processor may select instructions from the I-FLC 138 for execution by the pipeline instruction processor. A selected instruction is read from the I-FLC 138 and provided to a first execution pipeline stage 224 of the pipelined instruction processor.

Like above, not all of the instructions stored in the I-FLC 138 may be selected for execution by the pipelined instruction processor. If one of the instructions that include a parity error is actually selected from the I-FLC 138 for execution, then Abort Logic 270 and/or Interrupt Logic 274 may issue a parity error abort message, and the parity error may be dealt with at that time. However, some of the instructions in the I-FLC 138, which are marked as having a parity error, may not actually be selected for execution, and for these instructions, the instruction processor is not halted, and instruction execution is allowed to continue.

In some embodiments, the F0 register 312 of the first execution stage 224 of the pipelined instruction processor may include a parity error flag 315, which stores the parity error bit of the Instruction Queue 216 or I-FLC 138. Logic (not shown) may be provided that reads the parity error flag 315 from the F0 register 312, and may report the parity error flag to Abort Logic 270 and/or Interrupt Logic 274. Abort Logic 270 and/or Interrupt Logic 274 may, for example, halt the execution of the instruction that included the parity error (and in some cases, other instructions that follow the corrupted instruction), and may cause the selected instruction to be reloaded from the SLC 142 into the I-FLC 138, and eventually to the pipelined stages of the instruction processor for re-execution. As noted above, the Abort Logic 270 and/or Interrupt Logic 274 may be adapted to accomplish this without any required interaction with the operating system.

A system and method is also provided for detecting and recovering from errors in O-FLC 136. In one illustrative embodiment, when an instruction in the instruction pipeline requests an operand from O-FLC 136, a parity error detector 221 determines whether the requested operand has a parity error. If the operand does have a parity error, Abort Logic 270 and/or Interrupt Logic 274 may halt execution of the instruction that requested the corrupted operand (and sometimes instructions thereafter), mark the location in the O-FLC 136 that stored the operand that had the parity error, refetch the operand from the SLC 142 and store it in the O-FLC 136, and re-execute the instruction that requested the corrupted operand. In some cases, the instruction that requested the corrupted operand may already be at the second or third pipeline stage in the pipelined instruction processor. In some cases, the instruction may be moved back to the first pipeline stage when re-executed, if desired.

As noted above, and in some embodiments, the location of the operand in the O-FLC 136 that included the parity error may be marked, such as by setting a valid flag for that location to zero. When the corrupted operand is reloaded into the O-FLC 136, the operand may be reloaded into the same or a different location within the O-FLC 136. Subsequently, if an operand is read from a marked location of the O-FLC 136, and a parity error is again detected, the marked location (or in some cases, a block of locations) may be degraded. Such a situation may indicate a hard error at that memory location, rather than just a soft error. While this example downgrades the memory location (or in some cases, a block of locations) in the O-FLC 136 after a second operand that has a detected parity error is read from the memory location, it is contemplated that a memory location may be downgraded after any number of operands that have a detected parity error are read from the memory location (e.g. 2, 3, 4, 5, etc.).

In some illustrative embodiments, the number of downgraded memory locations in the O-FLC 136 may be tracked and/or counted. In some cases, if the number of downgraded memory locations in the O-FLC 136 exceeds a threshold number, a report may be sent to maintenance processor 319. The maintenance processor 319 may track how many and/or which portions (e.g. cache lines) of the O-FLC 136 have been marked and/or degraded. In some cases, the maintenance processor 319 may determine that the O-FLC 136 may need to be replaced during a next scheduled maintenance period. Meanwhile, however, the data processing system may continue to operate normally.

The data processing architectures set forth in the Figures and described herein provide several exemplary embodiments of systems that may utilize the current invention. Many other implementations are possible within the scope of the current invention, including pipeline architectures with more or fewer stages, with different stages, and/or stages that are implemented in a different manner using any combination or hardware and/or programmed logic.

In the foregoing Description, various features may be grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A pipelined instruction processor having a number of pipelined stages, comprising:
   an instruction queue for storing one or more instructions;
   an instruction selector for selecting a selected instruction from the instruction queue and for providing the selected instruction to the pipelined stages of the instruction processor for execution;
   a parity error detector for identifying which, if any, of the one or more instructions in the instruction queue, including the selected instruction, have a parity error, the parity error detector identifying which, if any, of the one or more instructions in the instruction queue have a parity error prior to the instruction selector selecting the selected instruction for execution by the pipelined stages of the instruction processor, the parity error detector setting a parity error bit for each of those queued instructions that have been identified as having a parity error, wherein the parity error bit, when set, indicates that the corresponding queued instruction has a parity error; and
   an error handler for issuing a parity error abort message if the instruction selected by the instruction selector has a parity error.

2. The pipelined instruction processor of claim 1, wherein the error handler is a parity error handler.

3. The pipelined instruction processor of claim 2, wherein the parity error handler halts execution of the selected instruction.

4. The pipelined instruction processor of claim 3, further comprising a first level cache for providing instructions to the instruction queue, and a second level cache for providing instructions to the first level cache, and wherein the parity error handler causes the selected instruction to be reloaded from the second level cache into the first level cache, and to the pipelined stages for re-execution.

5. The pipelined instruction processor of claim 4, wherein the selected instruction is initially read from a first portion of the first level cache, and wherein the parity error handler causes the selected instruction to be reloaded from the second level cache and into a second portion of the first level cache.

6. The pipelined instruction processor of claim 5, wherein the first portion of the first level cache is marked but still available for use.

7. The pipelined instruction processor of claim 6, wherein if a subsequent instruction is read from a marked portion of the first level cache and it is determined to have a parity error by the parity error handler, the marked portion of the first level cache is degraded and no longer used.

8. The pipelined instruction processor of claim 7, further comprising a maintenance processor, wherein the maintenance processor reports how many and/or which portions of the first level cache have been degraded and no longer used.

9. The pipelined instruction processor of claim 4, wherein the parity error detector checks those instructions that are read from the first level cache as they are provided to the instruction queue, the parity error detector identifies those instructions that have a parity error by setting a corresponding parity error bit that is stored along with the instructions in the instruction queue.

10. The pipelined instruction processor of claim 9, wherein the number of pipelined stages includes a first pipeline stage, and wherein the first pipeline stage includes a storage location for storing the parity error bit provided by the instruction queue.

11. The pipelined instruction processor of claim 10, wherein the parity error handler reads the parity error bit from the storage location in the first pipeline stage, and if the parity error bit is set, issues the parity error abort message.

12. A method for operating a pipelined instruction processor having a number of pipelined stages, the method comprising:
 queuing one or more instructions;
 identifying which, if any, of the one or more queued instructions have a parity error;
 setting a parity error bit for those queued instructions that have been identified as having a parity error, wherein the parity error bit, when set, indicates that the corresponding queued instruction has a parity error;
 selecting a selected one of the one or more instructions for execution;
 after the selected instructions has been selected for execution, determining if the selected instruction has a parity error by determining if the selected instruction has a parity error bit that has been set by the setting step;
 halting execution of the selected instruction if the determining step determines that the selected instruction has a parity error; and
 executing the selected instruction if the selected instruction does not have a parity error.

13. The method of claim 12 further comprising the step of issuing a parity error abort message if the selected instruction is determined to have a parity error.

14. The method of claim 13 further comprising the steps of:
 storing the one or more queued instructions in an instruction queue;
 providing one or more of the queued instructions to the instruction queue from a first level cache;
 providing one or more of the queued instructions to the first level cache from a second level cache; and
 reloading the selected instruction from the second level cache to the first level cache if the selected instruction has a parity error.

15. The method of claim 14 wherein the selected instruction is initially read from a first portion of the first level cache, and wherein the selected instruction is reloaded from the second level cache into a second portion of the first level cache.

16. The method of claim 15 further comprising the step of marking the first portion of the first level cache.

17. The method of claim 16 further comprising the step of degrading a marked portion of the first level cache if a subsequent instruction is read from the marked portion of the first level cache and is determined to have a parity error.

18. The method of claim 17 further comprising the step of reporting how many and/or which portions of the first level cache have been degraded.

19. The method of claim 14 wherein the identifying step identifies those instructions that have a parity error as they are read from the first level cache and provided to the instruction queue.

20. The method of claim 19 wherein the parity error bit is stored along with those instructions that have a parity error in the instruction queue.

21. The method of claim 19 wherein the number of pipelined stages includes a first pipeline stage, and wherein the first pipeline stage includes a storage location for storing the parity error bit provided by the instruction queue.

22. The method of claim 21 further comprising the steps of checking the parity error bit in the storage location of the first pipeline stage, and issuing the parity error abort message if the selected instruction has a parity error.

23. A method for operating a pipelined instruction processor having a number of pipelined stages, the method comprising:
 detecting a parity error in one or more instructions before the pipelined instruction processor actually calls the one or more instructions for execution by the pipelined stages of the instruction processor; and
 deferring interruption of the pipelined instruction processor until the pipelined instruction processor actually calls for execution of an instruction that has a detected parity error.

24. A method for operating a cache memory that has a number of memory locations, the method comprising:
 reading a data word from a selected memory location of the cache memory;
 checking the data word for a parity error, and if a parity error is present:
 checking to see if the selected memory location was previously marked a predetermined number of times as having previously provide a data word with a parity error, and if so, degrading the selected memory location to prevent the selected memory location from further use, and if not, marking the selected memory location; and
 writing another copy of the data word to the cache memory.

25. The method of claim 24 wherein the another copy of the data word is written to a different memory location in the cache memory than the selected memory location.

26. A method for operating a cache memory that has a number of memory locations, the method comprising:
 reading a data word from a selected memory location of the cache memory;
 checking the data word for a parity error, and if a parity error is present:
 checking to see if the selected memory location was previously marked as having previously provide a data word with a parity error, and if so, degrading the selected memory location to prevent the selected memory location from further use, and if not, marking the selected memory location;
 writing another copy of the data word to the cache memory;
 counting the number of degrades for the cache memory; and
 issuing an alert if the number of degrades for the cache memory exceeds a predetermined threshold.

27. The method of claim 24 wherein the cache memory is part of an operand cache memory.

28. The method of claim 27 wherein the cache memory is part of an instruction cache memory.

* * * * *